United States Patent
Files et al.

(10) Patent No.: US 11,026,071 B1
(45) Date of Patent: Jun. 1, 2021

(54) SYSTEM AND METHOD FOR BEAMSTEERING ACQUISITION AND OPTIMIZATION USING BLUETOOTH PROTOCOLS

(71) Applicant: Dell Products, LP, Round Rock, TX (US)

(72) Inventors: Jace W. Files, Round Rock, TX (US); Liam B. Quinn, Austin, TX (US); Abu S. Sanaullah, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/779,170

(22) Filed: Jan. 31, 2020

(51) Int. Cl.
| | |
|---|---|
| *H04W 4/40* | (2018.01) |
| *H04B 7/08* | (2006.01) |
| *H04B 7/06* | (2006.01) |
| *H04W 16/28* | (2009.01) |

(52) U.S. Cl.
CPC ............ *H04W 4/40* (2018.02); *H04B 7/0617* (2013.01); *H04B 7/086* (2013.01); *H04W 16/28* (2013.01)

(58) Field of Classification Search
CPC ..... H04W 88/10; H04W 88/06; H04W 36/14; H04W 16/14; H04W 92/20; H04W 4/40; H04W 16/28; H04B 7/0452; H04B 10/2581; H04B 7/0413; H04B 7/0689; H04B 7/0695; H04B 7/0617; H04B 7/086
See application file for complete search history.

(56) References Cited

U.S. PATENT DOCUMENTS

| | | | |
|---|---|---|---|
| 10,448,355 | B2 | 10/2019 | Reial |
| 2018/0176065 | A1 | 6/2018 | Deng |
| 2019/0319686 | A1 | 10/2019 | Chen |
| 2020/0366363 | A1* | 11/2020 | Li ................. H04L 5/0094 |

FOREIGN PATENT DOCUMENTS

| | | |
|---|---|---|
| WO | 2018/031875 A1 | 2/2018 |
| WO | 2018/075151 A1 | 4/2018 |
| WO | 2018/075168 A1 | 4/2018 |
| WO | 2018/145153 A1 | 8/2018 |
| WO | 2019/221977 A1 | 11/2019 |
| WO | 2020/005296 A1 | 1/2020 |

* cited by examiner

*Primary Examiner* — Fred A Casca
(74) *Attorney, Agent, or Firm* — Prol Intellectual Property Law, PLLC; H. Kenneth Prol

(57) ABSTRACT

An information handling system may include a processor; a memory; a wireless adapter to establish a millimeter-wave (mm-wave) between the information handling system and a BT enabled 5G access point; a Bluetooth (BT) link module to establish a BT connection with the BT enabled 5G access point and acquire BT signals from a plurality of BT antennas to calculate angle data descriptive of an angle of the information handling system relative to the BT enabled 5G access point. A beamsteering module to receive the angle data from the BT link module, conduct beamsweeping of a plurality of angles for a mm-wave antenna array using the angle data as an initial seed angle for the beamsweeping, determine a selected beamsteering pattern from the information handling system to the BT enabled 5G access point, and to initiate the mm-wave communication with the BT enabled 5G access point based on signal quality.

20 Claims, 9 Drawing Sheets

SYSTEM AND METHOD FOR BEAMSTEERING ACQUISITION AND OPTIMIZATION USING BLUETOOTH PROTOCOLS

FIELD OF THE DISCLOSURE

The present disclosure generally relates to information handling systems and more specifically relates to information handling systems that communicate with a Bluetooth® enabled 5G access point using beamsteering acquisition.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities via wireless connectivity.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
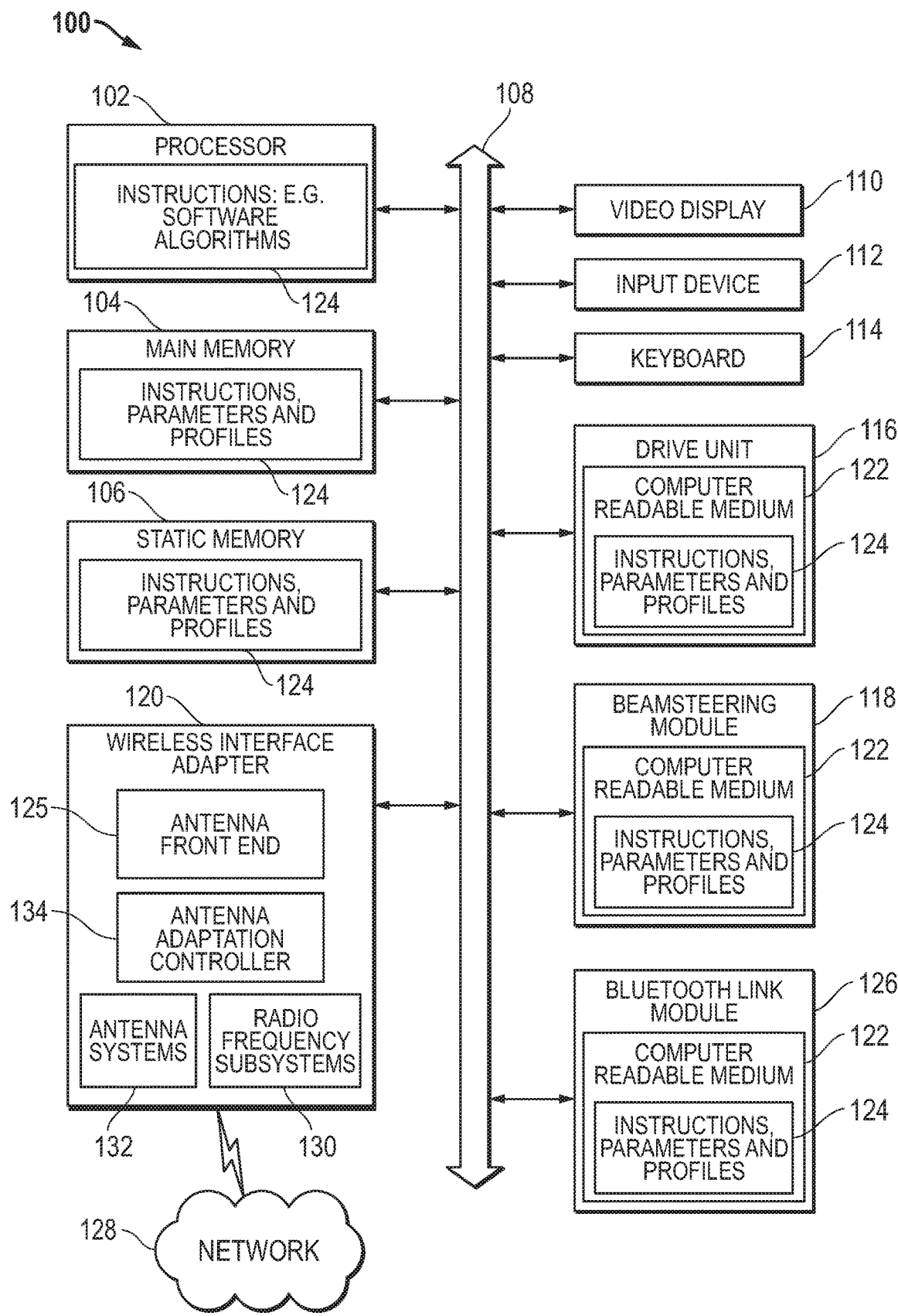
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for an information handling system that includes a processor, one or more controllers, memory, and a wireless adapter to determine whether a millimeter-wave (mm-wave) connection is established between the information handling system and a Bluetooth (BT) enabled 5G access point. Upon execution of a BT link module at a controller or processor, the information handling system may, when the wireless adapter determines that no mm-wave connection has been established between the information handling system and the BT enabled 5G access point, establish a BT connection with the BT enabled 5G access point; acquire BT signals from a plurality of BT antennas; calculate angle data descriptive of an angle of the information handling system relative to the BT enabled 5G access point; and calculate distance data descriptive of a distance of the information handling system from the BT enabled 5G access point.

In addition, the information handling system may include a beamsteering module. The beamsteering module may, upon execution at a controller or processor, receive the angle data and distance data from the BT link module; conduct beamsweeping of a plurality of angles for a mm-wave antenna array using the angle data as an initial seed angle for the beamsweeping; determine a selected beamsteering pattern from the information handling system to the BT enabled 5G access point to initiate the mm-wave communication with the BT enabled 5G access point based on signal quality above a first threshold level; and determine that the information handling system is within range of the BT enabled 5G access point to enable the mm-wave connection between the information handling system and BT enabled 5G access point using the selected beamsteering pattern.

In addition, in some embodiments, the beamsteering module further sends the distance data and angle data to the BT enabled 5G access point to allow the BT enabled 5G access point to steer the BT enabled 5G access point beamsteering pattern toward the information handling system during beamsweeping. The sending of this data and any selected information handling system beamsteering pattern for a 5G antenna array to the BT enabled 5G access point allows the BT enabled 5G access point to also create a reciprocal beamsteering pattern for 5G mm-wave communication between the BT enabled 5G access point and the information handling system even as the information handling system is moved within a communication range space of the BT enabled 5G access point.

In an alternative embodiment, the BT enabled 5G access point ma utilize the BT protocols to determine a seed angle for conducting improved beamsweeping from the BT enabled 5G access point. Calculated angle or distance data may be shared with the information handling system during beamsweeping to align directionality during a beam steering measurement phase. Further, the BT enabled 5G access point may select a beam steering pattern for 5G mm-wave communication and transmit this selected beamsteering pattern to the mobile information handling system. The mobile information handling system may select a reciprocal beamsteering pattern for the 5G mm-wave communication in such an example embodiment.

The information handling system may use Bluetooth® proximity tracking under the Bluetooth® protocol 5.1 to inform the information handling system as to how to engage in a beamsteering process. Bluetooth® is a registered trademark of the Bluetooth Special Interest Group. The BT enabled 5G access points able to communicatively couple to the information handling system may also implement the BT proximity tracking to engage in a beamsteering process. The beamsteering process at either the information handling system or the BT enabled 5G access point may use an angle of arrival or angle of departure to determine the orientation of the information handling system relative to the antennas of an BT enabled 5G access point. Upon acquisition of a BT connection with the BT enabled 5G access point, the angle of arrival and angle of departure data determining a location of the information handling system relative to the BT enabled 5G access point thus determine. Then, the main lobes of the radiation patterns produced by the mm-wave antennas of the information handling system may be altered to point between the determined location of the BT enabled 5G access point and the information handling system depending during beamsweeping. Thus, during operation, the information handling system BT enabled 5G access point may concurrently track location and orientation relative to one another using the BT proximity tracking process while also communicating on a mm-wave frequency or via another frequency of another available communication protocol. This allows for position determination of the information handling system that may affect the transmission of data over the mm-wave communication channels (e.g., across an array of mm-wave antennas).

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, a communications device, an BT enabled 5G access point (AP), a base station transceiver, a wireless telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include a memory (volatile (e.g. random-access memory, etc.), non-volatile (read-only memory, flash memory etc.) or any combination thereof), one or more processing resources, such as a central processing unit (CPU), the processor 102 illustrated in FIG. 1, a graphics processing unit (GPU), hardware or software control logic, or any combination thereof. Additional components of the information handling system 100 may include one or more storage devices, one or more communications ports for communicating with external devices, as well as, various input and output (I/O) devices, such as a keyboard 114, a mouse, a video/graphic display 110, or any combination thereof. The information handling system 100 may also include one or more buses operable to transmit communications between the various hardware components. Portions of an information handling system 100 may themselves be considered information handling systems 100 in the embodiments presented herein.

Further components of the information handling system 100 for use with embodiments herein may include positional sensors such as location sensors, movement sensors, or orientation sensors as described in various embodiments herein. Positional sensors may be any of gyroscope, an accelerometer, a global positioning satellite (GPS) sensor, magnetometer, orientation sensor, a tilt sensor, Hall sensors, or the like that may be used to detect angle of an information handling system, motion, and position of portions, such as a display chassis with respect to a base chassis, in various configurations. For example, the system may determine various configurations of a convertible laptop information handling system as a display chassis is opened to a variety of angles with respect to a base chassis. Positional sensors 113 may further include components for use with embodiments herein on the information handling system 100 include one or more light sensors that may be any form of light sensor including camera systems for detection of location, proximity or ambient light that may indicate position and orientation of a display chassis with respect to a display chassis. These positional sensors may be utilized to detect motion or change in orientation that may affect the beamsteering of 5G antenna arrays of embodiments herein. The positional sensors may be utilized for assessment of movement or position to refine angular data related to the position of the information handling system 100 relative to any 5G access point according to some embodiments.

Information handling system 100 may include devices or modules that embody one or more of the devices or execute instructions for the one or more systems and modules described herein, and operates to perform one or more of the methods described herein. The information handling system 100 may be a mobile information handling system seeking to establish a 5G mm-wave connection with a BT enabled 5G access point in one embodiments. In another embodiment, the information handling system 100 may operate as a BT enabled 5G access point to provide for mm-wave connection. For example, the information handling system 100 may operate as a BT enabled, next generation Node B (gNB) that is a 3GPP 5G next generation base station to support new radio 5G communications. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, computer readable medium 122 storing instructions 124 of the beamsteering module 118 and BT link module 126, and drive unit 116 (volatile (e.g. random-access memory, etc.), nonvolatile (read-only memory, flash memory etc.) or any combination thereof). The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input), and a keyboard 114. The information handling system 100 may also include a disk drive unit 116.

The network interface device shown as wireless interface adapter 120 may provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection. The wireless interface adapter 120 may operate in accordance with any wireless data communication standards. Wireless interface adapter 120 may include an antenna front end circuitry for receiving and transmitting signals, selecting channels, modulation/demodulation activity, and the like. Wireless interface adapter 120 may further include one or more antenna systems 132 and radio frequency subsystems to support one or more wireless communication standards as outlined and discussed with reference to embodiments herein. Further, as described further below, antenna system 132 may include antenna array systems to provide multiple available wireless channels as well as selection of directionality of wireless electromagnetic radiation nodes according to embodiments described herein such as relating to beamsteering. Additionally, wireless interface adapter 120 may include one or more controllers such as antenna adaptation controller 134 to support beamsteering functions, channel selection, and in some embodiments selection among one or more wireless protocols. As described in embodiments herein, the one or more controllers including antenna adaptation controller 134 may implement some or all of the BT link module 126 or some or all of a beamsteering module 118.

To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links. Further, connectivity of the information handling system 100 to, for example, an BT enabled 5G access point, may be available using any protocols related to a BT communication standard (e.g., BT 5.1 protocols using proximity tracking) or similar standards as described herein.

Wireless adapter 120, in an embodiment, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the BT standards, the WLAN standards, and WWAN standards, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN and BT, for example, may also operate at a 2.4 GHz band or 2.45 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

Wireless adapter 120, in an embodiment, may connect to any BT enabled 5G access point using a plurality of radio frequency (RF) bands that include both sub-six GHz bands as well as those RF bands that emit RF waves higher than 6 GHz. In an embodiment, the wireless interface adapter 120 may be communicatively coupled to an array of sub-six GHz antennas used to communicate with an BT enabled 5G access point. In an embodiment, the sub-six GHz antenna array may communicatively couple the information handling system with an BT enabled 5G access point using a BT connection. The wireless interface adapter 120 may also be operatively coupled to an array of antennas that emit RF waves higher than 6 GHz herein referred to a millimeter-wave (mm-wave) antennas. The mm-wave antennas may support a 5G wireless communication protocol so that relatively higher amounts of data may be transmitted between the information handling system 100 and any BT enabled 5G access point of a network.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 may communicate voice, video or data over the network 128. Further, the instructions 124 may be transmitted or received over the network 128 via the network interface device or wireless adapter 120.

The information handling system 100 may include a set of instructions 124 that may be executed to cause the computer system to perform any one or more of the methods or computer-based functions disclosed herein. For example, instructions 124 may execute a beamsteering module 118, a BT link module 126, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs. The beamsteering module 118 and BT link module 126 may operate as executable instructions on one or more controllers such as antenna adaptation controller 134 or as part of an antenna front end 125 within wireless adapter 120 in some embodiments. Some portions of beamsteering module 118 and BT link module 126 may operate also operate as code instructions 124 via processor 102 in some embodiments.

The disk drive unit 116, the BT link module 126, and the beamsteering module 118 may include a computer-readable medium 122 in which one or more sets of instructions 124 such as software may be embedded. Similarly, main memory 104 and static memory 106 may also contain a computer-readable medium for storage of one or more sets of instructions, parameters, or profiles 124 including an estimated training duration table. The disk drive unit 116 and static memory 106 may also contain space for data storage. Further, the instructions 124 may embody one or more of the methods or logic as described herein. For example, instructions relating to the BT link module 126 and beamsteering module 118 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 or one or more controllers of information handling system 100. As explained, some or all of the BT link module 126 and beamsteering module 118 may be executed locally or remotely. The main memory 104 and the processor 102, or one or more controllers also may include or access computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The BT link module 126 and beamsteering module 118 may be stored in static memory 106 such as at a controller 134, or the drive unit 116 on a computer-readable medium 122 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the BT link module 126 that may be operably connected to the bus 108. The computer readable medium 122 of the BT link module 126 may also contain space for data storage. The BT link module 126 may, according to the present description, perform tasks related to establishing a BT connection with an BT enabled 5G access point, acquiring BT signals from a plurality of antennas at the BT enabled 5G access point, calculating angle data descriptive of an angle of the information handling system relative to the BT enabled 5G access point, and calculating distance data descriptive of a distance of the information handling system from the BT enabled 5G access point. In some embodiments, the BT link module 126 may obtain BT 5.1 proximity data to aid in an initial acquisition of a connection between the information handling system 100 and a mm-wave antenna on an BT enabled 5G access point. The initial acquisition of the connection may be aided by the calculation of the angle data and distance data so that a mm-wave communication can be established with the BT enabled 5G access point via the modification of a main lobe of RF electromagnetic (EM) waves by the beamsteering module 118.

In an embodiment, the BT link module 126 may communicate with the main memory 104, the processor 102, the video display 110, the alpha-numeric input device 112, and the wireless adapter 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100. In one aspect, the BT link module 126 may operate wholly or partially on a controller such as 134 or another controller within the wireless adapter 120.

The information handling system 100 may also include the beamsteering module 118 that may be operably connected to the bus 108. The computer readable medium 122 of the beamsteering module 118 may also contain space for data storage. The beamsteering module 118 may, according to the present description, perform tasks related to receiving the angle data and distance data from the BT link module 126, calculating a beamsteering pattern from the information handling system to the BT enabled 5G access point to initiate the mm-wave communication with the BT enabled 5G access point, and determine that the information handling system 100 is within range of the BT enabled 5G access point to enable the mm-wave connection between the information handling system 100 and BT enabled 5G access point using the calculated beamsteering pattern so as to establish the mm-wave connection with the BT enabled 5G access point. In some embodiments, the beamsteering module 118 may further send the angle data and distance data to the BT enabled 5G access point so that a similar determination may be made by the BT enabled 5G access point as to the range of the BT enabled 5G access point relative to the information handling system 100 in order to enable the mm-wave connection between the BT enabled 5G access point and the information handling system 100 the calculated beamsteering pattern.

In an embodiment, the beamsteering module 118 may communicate with the main memory 104, the processor 102, the video display 110, the alpha-numeric input device 112, and the wireless adapter device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100. In one aspect, the beamsteering module 118 may operate wholly or partially on a controller such as 134 or another controller within the wireless adapter 120

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
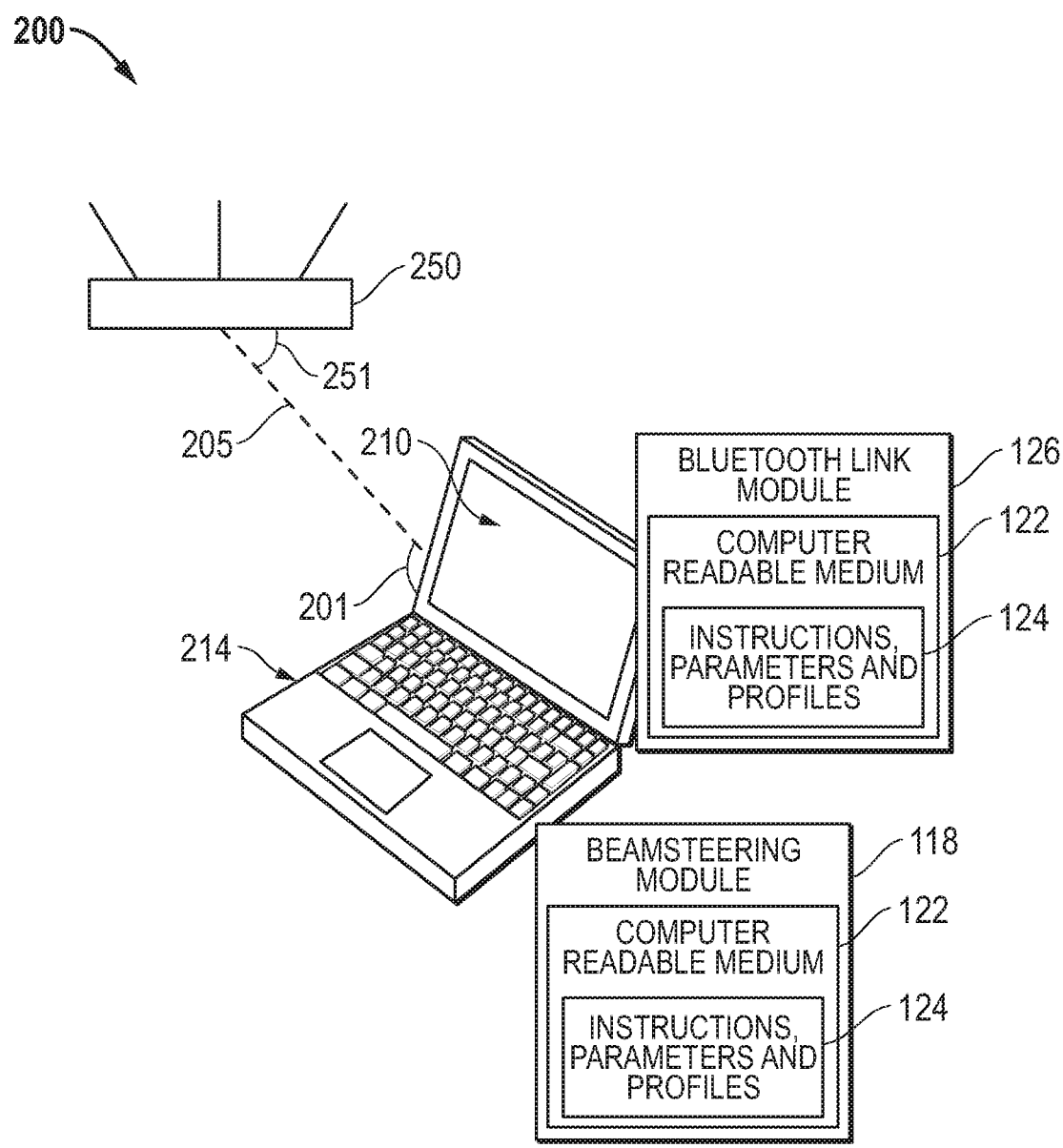
FIG. 2 is a block diagram illustrating an information handling system according to an embodiment of the present disclosure.

FIG. 2 is a block diagram illustrating an information handling system 200 according to an embodiment of the present disclosure. The information handling system 200 may be any type of device that computes, classifies, processes, transmits, receives, retrieves, originates, switches, stores, displays, manifests, detects, records, reproduces, handles, or uses any form of information, intelligence, or data for business, scientific, control, entertainment, or other purposes. In the example shown in FIG. 2, the information handling system 200 is a laptop device that includes a screen portion 210 including a screen to present visual data to a user. The information handling system 200 may also include a keyboard portion 214 that includes a number of actuatable keys that allows a user to provide input to the information handling system 200. Via interaction with the keyboard portion 214 by a user, the user may input data into the information handling system 200 and receive output from the screen portion 210. In the embodiments described herein, the information handling system 200 may include one or more antenna system locations where both sub-six GHz and RF EM waves higher than 6 GHz. Any number of antenna systems may be present and may include an array of sub-sex GHZ antennas and an array of antennas that emits RF EM waves at 6 GHz or more. Although FIG. 2 shows the information handling system 200 as a laptop computing device, the present description contemplates that any type of computing device and/or combination of computing devices may be used to execute the processes and methods described herein. FIG. 2 also shows a BT enabled 5G access point 250 for wireless connection with information handling system 200.

The information handling system 200 may include a BT link module 126. The BT link module 126 may be executed at a controller in a wireless adapter, at a processor, or some combination in embodiments herein. As described herein, the BT link module 126 may establish a BT connection with the BT enabled 5G access point 250 when, for example, a wireless adapter of the information handling system 100 determines no mm-wave connection between the information handling system and the BT enabled 5G access point 250 is present. The BT link module 126 may acquire a plurality of signals from a plurality of antennas at the BT enabled 5G access points. From the signals, the BT link module 126 may receive I/Q data. In these embodiments, the I/Q data is descriptive of any changes in magnitude or amplitude as well as a phase of a sine wave emitted by the antennas of the BT enabled 5G access points. This I/Q data may be used to determine or calculate angle data descriptive of an angle 201 or 251 of the information handling system 200 relative to the BT enabled 5G access point 250 in a three-dimensional space. The BT link module 126 may also be used to calculate distance data descriptive of a distance 205 of the information handling system 200 from the BT enabled 5G access point 250.

By way of example, the BT link module 126 may operate under certain BT protocols such as BT 5.1 protocols. During operation of the BT link module 126, in an embodiment, the information handling system 200 may include multiple antennas formed in a linear array and the BT link module 126 may communicatively couple the BT enabled 5G access point 250 that may include one or more antennas to transmit data. During operation, a sub-six GHz 5G EM wave travels from the information handling system 100 as a planar wave front rather than spherically. If the information handling system 200, which is sending a sine wave through the air, lies on the normal line perpendicular to the BT enabled 5G access point 250, every antenna (e.g., channel) of the antennas of the BT enabled 5G access point 250 will see the incoming signal at the same phase. If the information handling system 100 does not lie on the normal line, then the receiving antennas of the BT enabled 5G access point 250 will see phase differences between the channels. This phase difference information can be used to calculate an angle of arrival (AoA).

During operation, the BT enabled 5G access point 250 may include multiple antennas or use an RF switch to take samples from each individual antenna. The samples are called "IQ-samples" as the relate to sample pairs of "In-phase" and "Quadrature-phase" data readings taken from a single input signal. These samples have a 90-degree phase difference in the sampling and these pairs of data readings are considered to be complex values with each complex value containing both phase and amplitude information. These complex values may be used as input for an arrival angle (AoA) estimation algorithm calculated by the BT link module 126.

Because RF waves travel at the speed of light 300,000 km/s, when using frequencies around 2.4 GHz, the corresponding wavelengths are about 0.125m. A maximum distance between two adjacent antennas (e.g., the antennas of the information handling system 100 and BT enabled 5G access point 250) for most estimation algorithms is, therefore, about a half wavelength. For angle of departure (AoD), the process of measuring phase differences is similar, but the roles of the devices (e.g., the information handling system 200 and BT enabled 5G access point 250) are swapped. In AoD, the device being tracked (e.g., the information handling system 200 or the BT enabled 5G access point 250) implements a single antenna while the transmitting devices (e.g., BT enabled 5G access point 250 or the information handling system 200, respectively) use multiple antennas. In an embodiment, the angle data 201 or 251 may be calculated by estimating the AoA of an emitted (narrowband) signal arriving at a receiving array on the information handling system 200. The present specification contemplates that any process or algorithm may be used to make the calculation of the angle data described herein. In these embodiments presented herein, the AoA may be used to aid in an initial acquisition of a connection between the BT enabled 5G access point 250 and the information handling system 200 via a 5G mm wave antenna array or multiple 5G mm wave antennas.

The information handling system 100 further includes a beamsteering module 118. The beamsteering module 118 may be executed by a controller, a processor, or some combination in the information handling system 200 to calculate a beamsteering pattern from the information handling system 200 to the BT enabled 5G access point 250 to initiate the mm-wave communication with the BT enabled 5G access point 250 and determine that the information handling system is within range of the BT enabled 5G access point 250 to enable the mm-wave connection between the information handling system and BT enabled 5G access point 250 using the calculated beamsteering pattern. The beamsteering module 118 may conduct beamsweeping by sampling various angles of beamsteering pattern directionality or by testing all available angles of beamsteering directionality from the 5G mm wave antennas to find a beamsteering pattern to optimize the 5G mm-wave communication. This beamsweeping may be conducted to determine a sufficient or even optimized beamsteering pattern with an available BT enabled access point 250 that is within range. This is done to provide improved functionality in mm-wave spectrum which may be otherwise subject to limited range or interference due to obstacles despite potentially high bandwidth. The beamsteering module 118 may modulate the RF EM waves emitted by a mm-wave antenna such that those RF EM waves change directions to reach the BT enabled 5G access point 250 via a selected beamsteering pattern form the plurality of 5G mm-wave antennas such as an antenna array. This may increase the distance the information handling system 200 may be from the BT enabled 5G access point 250 or also increase the reliability of the mm-wave connection between the information handling system 200 and the BT enabled 5G access point 250.

In an embodiment, the beamsteering module 118 may be responsible for sending the distance data and angle data to the BT enabled 5G access point to allow the BT enabled 5G access point 250 to calculate a beamsteering pattern from the BT enabled 5G access point 250 to the information handling system to create a mm-wave communication from the BT enabled 5G access point 250. As such, the information handling system 20 may send and receive 5G-level data to and from the BT enabled 5G access point 250. Still further, the BT link module 126 may continue to monitor the position of the information handling system 200 relative to any given BT enabled 5G access point 250 and determine if and when to hand over mm-wave communication to another BT enabled 5G access point 250 when it is determined, based on the angle and distance data, that the mm-wave connection cannot be maintained unless a new beamsteering pattern is used or a new connection to a new mm-wave BT enabled 5G access point 250 is established.

According to these embodiments, the information handling system 200 may be initially communicatively coupled to an BT enabled 5G access point 250 via a sub-six GHz connection such as 2.45 GHz used in the BT 5.1 protocols.

After acquiring the angle and distance data and selecting a beamsteering pattern for an optimal angle, the beamsteering module 118 may initiate a mm-wave communication protocol with the BT enabled 5G access points. Any sub-six GHz antennas of the information handling system 100 may iteratively determine the location of the information handling system 200 within the three-dimensional space covered by the network of BT enabled 5G access points 250 so that a mm-wave connection may be maintained between the mm-wave antennas of the information handling system and the mm-wave antennas of any BT enabled 5G access point 250 within the network of BT enabled 5G access points. In an embodiment, the BT enabled 5G access points 250 may be communicatively coupled to, for example, an edge gateway that allows for communication between the BT enabled 5G access points 250 so as to pass the angle data and distance data descriptive of the placement of the information handling system 200 within a physical space so that handoffs from one BT enabled 5G access point 250 to another provide for reciprocal beamsteering pattern adjustments and the transition appears as a seamless process to a user of the information handling system 200. As such the information handling system 200 may be physically tracked within the three-dimensional space so that such a handoff may occur.

The modulation of the RF EM waves by the beamsteering module 118 may be accomplished using any beamsteering process. In an embodiment, the beamsteering module 118 may implement a beam sweeping process as described such as covering a spatial area with a set of beams transmitted and received according to pre-specified intervals and directions. In an embodiment, the beamsteering module 118 may implement a beam measurement processes by engaging in any evaluation of a quality of any received signal. In an embodiment, the beamsteering module 118 may implement a beam determination process such as a process that includes a selection of the suitable beam or beams for a selection of beamsteering patterns according to the measurements obtained with the beam measurement procedure. In an embodiment, the beamsteering module 118 may implement a beam reporting process that sends beam quality and beamsteering pattern decision information across the network of BT enabled 5G access points 250.

The beamsweeping process may be time and resource consuming, and, thus, utilization of the BT link module 126 and BT proximity tracking can provide calculation of angles 251 or 201 and distance 205 data for one or more BT enabled 5G access points 250. This angle data 251 or 201 may be used as initial seed angles for the beamsweeping process to measure and select a beamsteering pattern angle between the information handling system 200 and the BT enabled 5G access point 250. With the initial seed angle, other angular zones may be spot checked for measurements of signal quality as compared to a zone with the initial seed angle to assist in elimination of beamsteering pattern angles. This may significantly expedite the beamsweeping process in embodiments herein.

Figure 3:
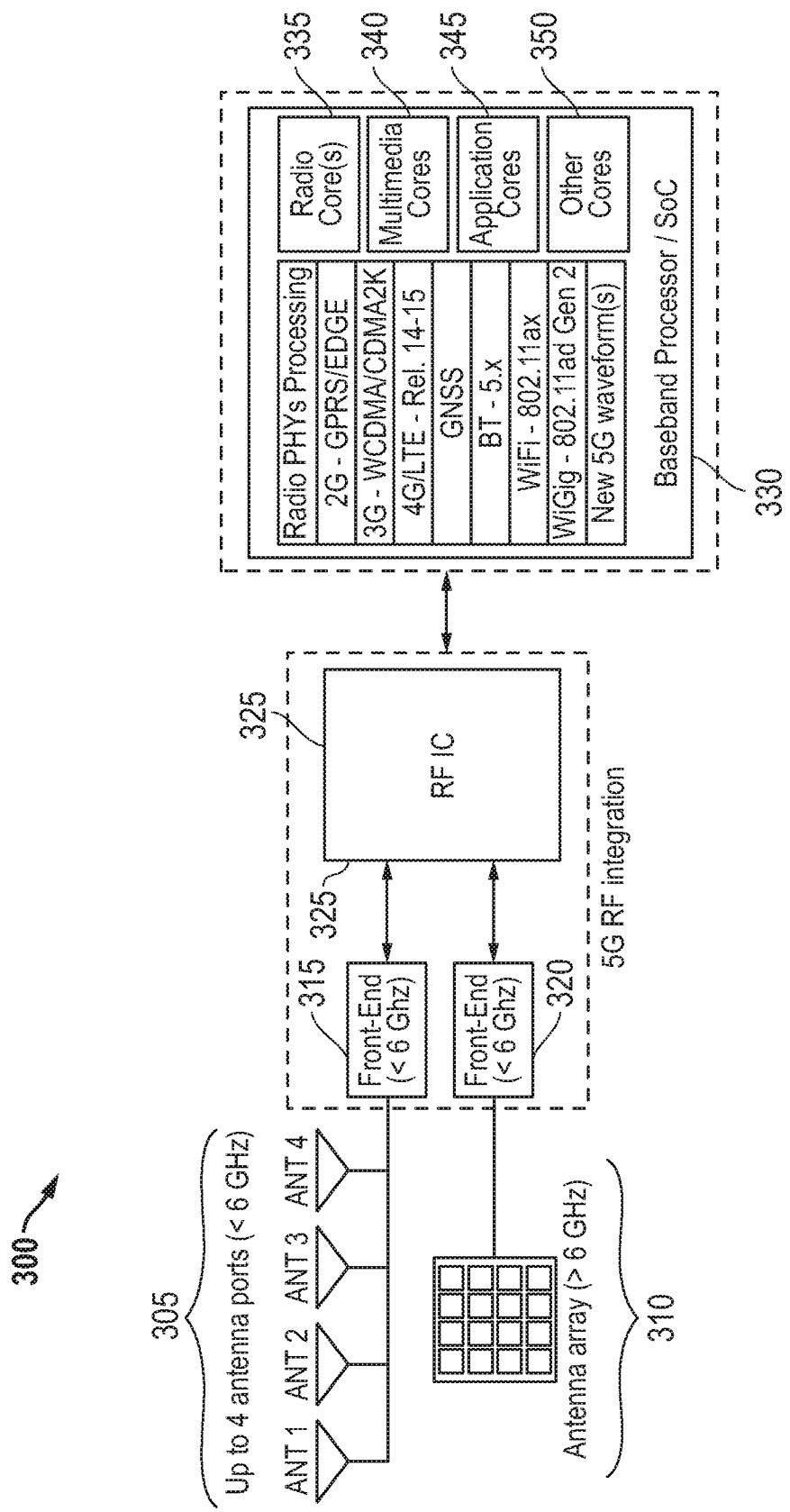
FIG. 3 is a block diagram illustrating an information handling system according to an embodiment of the present disclosure.

FIG. 3 is a block diagram illustrating an information handling system wireless interface adapter 300 and antenna systems 305 and 310 according to an embodiment of the present disclosure. The information handling system wireless interface adapter 300 may include an array of sub-six GHz antennas 305 that allow the information handling system wireless interface adapter 300 to initiate a sub-six GHz communication with an BT enabled 5G access points. The array of sub-six GHz antennas 305 may operate at, for example, between 2.400 GHz and 2.483. 5 GHz, in order to initiate a BT communication from the information handling system wireless interface adapter 300 as described herein.

The array of sub-six GHz antennas 305 may be distributed among a base chassis or a display chassis of an information handling system in some embodiments. In an embodiment, the array of sub-six GHz antennas 305 may be a 4×4 (e.g., four antennas simultaneously transceiving) multiple input/multiple output (MIMO) array of antennas. In an embodiment, the 4×4 MIMO array of antennas is operated under a fifth generation (5G) wireless technology standard on a frequency spectrum that includes, among other bands 2.4 GHz frequencies associated with BT communications. In an embodiment the designs of the 4×4 MIMO array of antennas may be similar to antennas used for fourth-generation (4G) antenna systems with a total number of antenna ports limited to four antenna ports.

In an embodiment, the array of sub-six GHz antennas 305 may be communicatively coupled to a sub-six GHz antenna front end 315. The sub-six GHz front end antenna 315 may serve as part of a radio frequency (RF) integrated circuit (IC) 325 that is formed between the 4×4 MIMO array of antennas 305 and a baseband system on chip (SoC) 330 that is part of the information handling system wireless interface adapter 300. The sub-six GHz antenna front end 315 may be a dedicated front end independent of any other front end RF ICs 325, or may be combined with other front end RF ICs 325 formed within the information handling system. In an embodiment, the RF IC 325 may be used to control and drive data signals at the communication bands described herein as well as modulate, demodulate, and amplify those RF signals, among other functions.

In an embodiment, the information handling system wireless interface adapter 300 may further include an array of mm-wave antennas 310. Although the present description may refer to the array of mm-wave antennas 310 as emitting a mm-wave RF EM signal, the present specification contemplates that the array of mm-wave antennas 310 may emit an RF EM signal that is equal to or greater than 6 GHz. As described herein, the information handling system wireless interface adapter 300 may initiate a communication between the information handling system wireless interface adapter 300 and an BT enabled 5G access point using the array of sub-six GHz antennas 305 via, in an example, BT protocols descried herein. After receipt of I/Q data that is descriptive of any changes in magnitude or amplitude as well as a phase of a sine wave emitted by the antennas of the BT enabled 5G access point, the information handling system wireless interface adapter 300 may use the array of mm-wave antennas 310 to conduct a beamsweeping process for selecting a beamsteering pattern among a plurality of possible node angles available with an array of mm-wave antennas 310 according to embodiments herein. The information handling system wireless interface adapter 300 may select a beamsteering pattern meeting threshold signal quality levels or that is optimized for signal quality in various embodiments from measurement of signal quality at one or more node angles during beamsweeping. Upon selection of a beamsteering pattern, the information handling system wireless interface adapter 300 may initiate a mm-wave communication with the BT enabled 5G access point. In an embodiment, the antennas of the array of mm-wave antennas 310 may be fully integrated into a mm-wave antenna front end 320 as a single component package.

In an embodiment, the array of mm-wave antennas 310 may be communicatively coupled to the mm-wave antenna front end 320. The mm-wave antenna front end 320 may serve as part of a radio frequency (RF) integrated circuit (IC)

325 that is formed between the array of mm-wave antennas 310 and a baseband system on chip (SoC) 330. The array of mm-wave antennas 310 may be a dedicated front end independent of any other front end RF ICs 325, or may be combined with other front end RF ICs 325 formed within the information handling system. In an embodiment, the RF IC 325 may be used to control and drive data signals at the communication bands described herein as well as modulate, demodulate, and amplify those RF signals, among other functions.

The information handling system wireless interface adapter 300 may include, in an embodiment, a baseband processor/system-on-a-chip (SoC) 330 as an antenna adaptation controller. The SoC 330 may include any number of cores 335, 340, 345, 350 as example radiofrequency subsystems that execute computer readable program code to perform any one or more of the methods or computer-based functions disclosed herein. In an embodiment, the SoC 330 may include a radio core 335. The radio core 335 may execute computer readable program code that performs any one or more of the methods or computer-based functions disclosed herein. In an embodiment, the radio core 335 of the SoC 330 may control the RF IC 325 to selectively cause the array of sub-six GHz antennas 305 and the array of mm-wave antennas 310 to emit sub-six GHz RF EM waves and millimeter RF EM waves, respectively. The radio core 335, in an embodiment, may also receive angle data and distance data and cause the beamsteering module (not shown) to calculate a beamsteering pattern from the information handling system to the BT enabled 5G access point to initiate the mm-wave communication with the BT enabled 5G access point and determine that the information handling system is within range of the BT enabled 5G access point to enable the mm-wave connection between the information handling system and BT enabled 5G access point using the calculated beamsteering pattern. That angle data and distance data may be received by the radio core 335 via the array of sub-six GHz antennas 305 from, in an embodiment, an BT enabled 5G access points. During operation of the information handling system wireless interface adapter 300, the radio core 335 may cause the array of sub-six GHz antennas 305 to initiate a BT communication with an BT enabled 5G access point on a network. Upon detection of the angle data and distance data via acquisition of the I/Q data, the radio core 335 of the SoC 330 may cause the array of mm-wave antennas 310 to establish a mm-wave connection with the BT enabled 5G access points.

In an embodiment, the radio core 335 of the SoC 330 may further cause the array of sub-six GHz antennas 305 to monitor for and receive angle data and distance data by a request for I/Q data as described herein. In this embodiment, while the mm-wave communication is active between the information handling system wireless interface adapter 300 and the BT enabled 5G access points, the radio core 335 may iteratively determine the position of the information handling system wireless interface adapter 300 relative to the BT enabled 5G access point. If it is determined that the information handling system wireless interface adapter 300 is moving away from any given BT enabled 5G access points, the radio core 335 may attempt to conduct a handoff process that may establish a new mm-wave connection with another BT enabled 5G access point within the network of BT enabled 5G access points.

The radio core 335 may, in an embodiment, conduct some or all of the physical layer processing of any RF EM waves emitted by the array of sub-six GHz antennas 305 and array of mm-wave antennas 310. In an embodiment, the radio core 335 may cause the array of sub-six GHz antennas 305 and array of mm-wave antennas 310 to emit any band of RF EM waves that allow the information handling system wireless interface adapter 300 to establish communications with an BT enabled 5G access point as described herein. Example RF EM bands may include second generation (2G) bands initiated using the general packet radio service (GPRS) protocols or enhanced GPRS (EDGE) protocols; third generation (3G) bands initiated using the wideband code division multiple access (WCDMA) protocols or CDMA2000 (CDMA2K) standard; fourth generation (4G)/Long-Term Evolution bands; frequency bands associated with global navigation satellite systems (GNSS); frequency bands associated with BT 5.x protocols; frequency bands associated with Wi-Fi 802.11ax standards; frequency bands associated with WiGig 802.11ad Gen 2 standards; and frequency bands associated with fifth-generation (5G) technologies.

The SoC 330 may include a multimedia core 340. The multimedia core 340 may be any processing device that processes images, video and sound as well as many types of scientific and engineering tasks to be conducted by the information handling system wireless interface adapter 300. In an embodiment, the multimedia core 340 may be an IP multimedia core network subsystem (IMS) to deliver IP multimedia services to the information handling system wireless interface adapter 300.

The SoC 330 may include an application core 345. In an embodiment, the application core 345 may execute any computer readable program code that causes the information handling system wireless interface adapter 300 to perform any one or more of the methods or computer-based functions disclosed herein. In an embodiment, the application core 345 may execute computer readable program code that establishes a BT connection with the BT enabled 5G access point; acquires BT signals from a plurality of antennas at the BT enabled 5G access point; calculates angle data descriptive of an angle of the information handling system relative to the BT enabled 5G access point; calculates distance data descriptive of a distance of the information handling system from the BT enabled 5G access point; calculates a beamsteering pattern from the information handling system to the BT enabled 5G access point to initiate the mm-wave communication with the BT enabled 5G access point; and determines that the information handling system is within range of the BT enabled 5G access point to enable the mm-wave connection between the information handling system and BT enabled 5G access point using the calculated beamsteering pattern. In these embodiments, the functions initiated by the BT link module and beamsteering module described herein may implement the processing resources of the application core 345.

In an embodiment, the SoC 330 may include other processing cores 350. The other processing cores 350 may execute any computer readable program code along with the radio core 335, multimedia core 340, and application core 345 to perform any one or more of the methods or computer-based functions disclosed herein. These other processing cores 350 may be used by any of the radio core 335, multimedia core 340, or application core 345 in a processing resource sharing protocols that increase the processing power of any of these cores 335, 340, 345. The information handling system wireless interface adapter 300 and antenna systems 305 and 310 are described above for operation on an information handling system such as a mobile information handling system seeking to establish 5G mm-wave communications. However, the above information handling system wireless interface adapter 300 and antenna systems 305 and 310 may also be similarly implemented in whole or in parts as a BT enabled access point in other embodiments herein.

Figure 4:
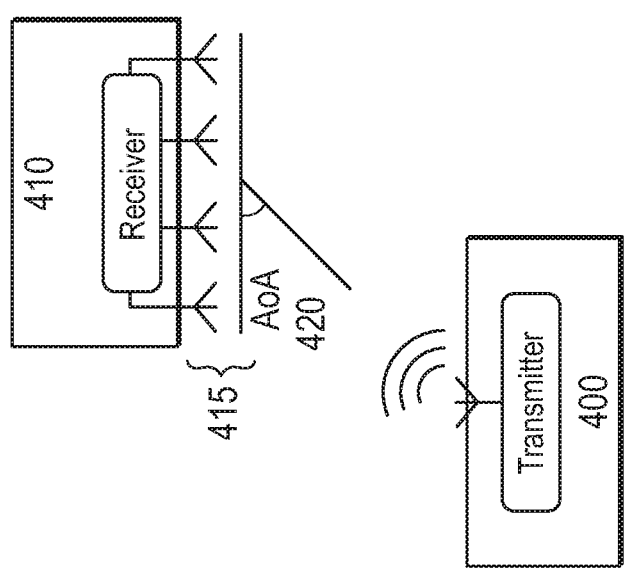
FIG. 4 is a block diagram illustrating a wireless interaction between a transmitter and a receiver according to an embodiment of the present disclosure.

FIG. 4 is a block diagram illustrating a wireless interaction between a transmitter 400 and a receiver 410 according to an embodiment of the present disclosure. In an embodiment, the transmitter 400 may be any one of an information handling system or a BT enabled access point while the receiver 410 may be an opposite of one of the information handling system or a BT enabled access point as described herein. Accordingly, where the transmitter 400 is an antenna array or single antenna within an information handling system, the receiver 410 is a BT enabled 5G access point as described herein. Similarly, where the transmitter 400 is an antenna array or single antenna within a BT enabled 5G access points, the receiver 410 is an information handling system as described herein.

For purposes of explanation, the transmitter 400 may be an information handling system that includes a transmitting antenna system such as the array of sub-six GHz antennas and array of mm-wave antennas described in connection with FIG. 3. For ease of explanation, the transmitter 400 will be referred to herein, as an information handling system 400. The information handling system 400 may communicate with a receiver 410 that is described as, for ease of explanation, a 5G access point 410. The BT enabled 5G access point 410 may be a single BT enabled 5G access point 410 or may be part of a network of BT enabled 5G access points 410 according to embodiments of the present disclosure.

The information handling system 400 may, via a network interface device, for example, provide connectivity to a network, e.g., a wide area network (WAN), a local area network (LAN), wireless local area network (WLAN), a wireless personal area network (WPAN), a wireless wide area network (WWAN), or other networks to which the BT enabled 5G access point 410 forms a part of that network. Connectivity between the information handling system 400 and the BT enabled 5G access point 410 may be via a wireless connection. The information handling system 400 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, the information handling system 400 operates two or more wireless links either successively or concurrently. Further, connectivity of the information handling system 400 to, for example, the BT enabled 5G access point 410, may be available using any protocols related to a BT communication standard (e.g., BT 5.1 protocols using proximity tracking), and mm-wave communication standards described herein, among other similar standards as described herein.

In the embodiment shown in FIG. 4, the BT enabled 5G access point 410 may include any type of BT enabled 5G access point antenna array 415. In an embodiment, the BT enabled 5G access point 410 may include an BT enabled 5G access point antenna array 415 that is similar to the array of sub-six GHz antennas and array of mm-wave antennas of the information handling system 400. During operation of the information handling system 400, the information handling system 400 may communicate, initially, with the BT enabled 5G access point 410 via an array of sub-six GHz antennas using a BT protocol in order to receive angle of arrival (AOA) 420 data, I/Q data, and distance data used by the information handling system 400 to subsequently establish a mm-wave communication with the BT enabled 5G access point 410 using an array of mm-wave antennas. In an embodiment, the BT enabled 5G access point 410 may also include BT enabled 5G access point antenna array 415 that includes mm-wave antenna systems to communicate with the information handling system 400 using mm-wave frequencies and protocols.

During operation, the information handling system 400 may commence in a beam management initial access process that includes establishing a BT link between the information handling system and a Bluetooth module of the BT enabled 5G access point. In an example embodiment, the BT enable 5G access point may be a BT enabled, next generation Node B (gNB) that is a 3GPP 5G next generation base station that supports new radio 5G communications. The commencement of the beam management initial access process causes the BT enabled 5G access point 410 to determine angle data from a detected angle of arrival or angle of departure of the signal between the information handling system 400 and BT enabled 5G access point 410. In an embodiment, the angle of arrival 415 may be used to determine the orientation of the information handling system 400 relative to the antennas (e.g., the BT enabled 5G access point antenna array 415) of an BT enabled 5G access point 410. As described herein, this angle of arrival 420 data may be determined using any type of analysis at the BT enabled 5G access point 410 such as time-of-flight (ToF) analysis and phase difference information among the BT enabled 5G access point antenna array 415 to determine relative angle data and distance data. In an embodiment, the BT enabled 5G access point antenna array 415 may be placed in a linear arrangement and the RF EM waves may be received at the BT enabled 5G access point antenna array 415 as a planar wave front. In this embodiment, a sine wave may be emitted by the information handling system 400 and every antenna of the BT enabled 5G access point antenna array 415 will be used to detect the incoming signal in the same phase when the transmitting antenna of the information handling system 400 lies on a normal plane perpendicular to the linear BT enabled 5G access point antenna array 415. Where the transmitting antenna of the information handling system 400 does not lie on a normal plane perpendicular to the linear BT enabled 5G access point antenna array 415, each of the antennas of the linear BT enabled 5G access point antenna array 415 will each detect a phase difference amongst themselves. This phase difference data may be used to calculate the data related to the AoA 420. In an embodiment, the data related to the AoA 420 may be relayed back to the information handling system 400 for the information handling system 400 to set directionality toward a BT enabled 5G access point 410 during a beamsweeping and beam measurement phase of a beamsteering process at BT enabled 5G access point 410. The BT enabled 5G access point 410 may use the angle data 420 as an initial seed angle with its beamsteering module while conducting beamsweeping and beam measurement to reduce the burden of the beamsweeping phase.

Then the BT enabled 5G access point 410 may select a beamsteering pattern of node directionality for a mm-wave antenna array 410 meeting a threshold signal quality level or optimized for a best signal quality option. The selected beamsteering pattern may be transmitted by the BT enabled 5G access point 410 to the information handling system 400 to calculate a reciprocal beamsteering pattern as described herein.

In an embodiment, the BT enabled 5G access point antenna array 415 may use an RF switch (not shown) to take samples from each of the antennas of the BT enabled 5G access point antenna array 415 when the BT link module conducts assessment of the angle 420. These samples are called "IQ-samples" since a sample pair of "In-phase" and "Quadrature-phase" readings are taken from the same input signal originating at the information handling system 400. Again, this I/Q data may be sent to the information handling system 400 for calculation of reciprocal beamsteering pattern if angle 420 is selected for node directionality to be used by the information handling system 400 to initiate a mm-wave communication with the BT enabled 5G access point 410.

While the above-described embodiment of FIG. 4 describes a BT enabled 5G access point as receiver 410 and conducting assessment of angle 420 via BT link module and selection of beamsteering pattern via a beamsteering module, it is contemplated that the transmitter 400 and receiver 410 roles be reversed between the BT enabled 5G access point and information handling system. In embodiments herein, either the information handling system or the BT enabled 5G access point may be used with a BT link module to obtain the AoA 420 for an initial seed angle for beamsweeping. In further embodiments herein, either the information handling system or the BT enabled 5G access point may be used with a beamsteering module to conduct a beamsweeping process and measurement to select a beamsteering pattern.

Figure 5:
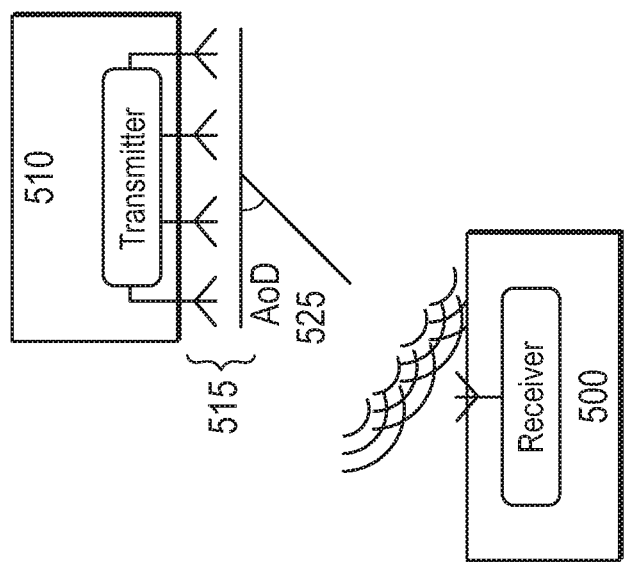
FIG. 5 is a block diagram illustrating a wireless interaction between a transmitter and a receiver according to an embodiment of the present disclosure.

FIG. 5 is a block diagram illustrating a wireless interaction between a transmitter 510 and a receiver 500 according to an embodiment of the present disclosure. In an embodiment, the transmitter 510 may be any one of an information handling system or an access point while the receiver 500 may be an opposite of one of the information handling system or an access point as described herein. Accordingly, where the transmitter 510 is an antenna array or single antenna within an information handling system, the receiver 500 is a BT enabled 5G access point that includes an antenna system as described herein. Similarly, where the transmitter 510 is an antenna array or single antenna within a BT enabled 5G access points, the receiver 500 is an information handling system as described herein.

For purposes of explanation, the transmitter 510 may be an information handling system that includes a transmitting antenna system such as the array of sub-six GHz antennas and array of mm-wave antennas described in connection with FIG. 3. For ease of explanation, the transmitter 510 will be referred to herein, as an information handling system 510. The information handling system 510 may communicate with a receiver 500 that is described as, for ease of explanation, a 5G access point 500. The BT enabled 5G access point 500 may be a single BT enabled 5G access point 500 or may be part of a network of BT enabled 5G access points 500 according to embodiments of the present disclosure.

The information handling system 510 may, via a network interface device for example, provide connectivity to a network, e.g., a wide area network (WAN), a local area network (LAN), wireless local area network (WLAN), a wireless personal area network (WPAN), a wireless wide area network (WWAN), or other networks to which the BT enabled 5G access point 500 forms a part of that network. Connectivity between the information handling system 510 and the BT enabled 5G access point 500 may be via a wireless connection. The information handling system 510 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, the information handling system 510 operates two or more wireless links either successively or concurrently. Further, connectivity of the information handling system 510 to, for example, the BT enabled 5G access point 500, may be available using any protocols related to a BT communication standard (e.g., BT 5.1 protocols using proximity tracking), and mm-wave communication standards described herein, among other similar standards as described herein.

In the embodiment shown in FIG. 5, the information handling system 510 may include any type of information handling system antenna array 515. In an embodiment, the information handling system 510 may include an antenna array 515 that is similar to the array of sub-six GHz antennas and array of mm-wave antennas of the information handling system front end of FIG. 3. During operation of the information handling system 510, the information handling system 510 may communicate, initially, with the BT enabled 5G access point 500 via an array of sub-six GHz antennas using a BT protocol in order to receive angle of arrival (AOA) data, I/Q data, and distance data used by the information handling system 510 to subsequently establish a mm-wave communication with the BT enabled 5G access point 500 using an array of mm-wave antennas as described above for FIG. 4. In an embodiment, the BT enabled 5G access point 500 may also include BT enabled 5G access point antenna array that includes mm-wave antenna systems to communicate with the information handling system 510 using mm-wave frequencies and protocols.

The data descriptive of an angle of departure (AoD) 525 may be used to determine the orientation of the information handling system 510 relative to the antennas (e.g., the BT enabled 5G access point antenna array 415) of an BT enabled 5G access point 500. As described herein, this angle of departure 525 data may be determined using any type of analysis at the BT link module of the information handling system 510 such as time-of-flight (ToF) analysis and phase difference information among the information handling system antenna array 515 or among an antenna array at the BT enabled 5G access point 500 in various embodiments.

For the data descriptive of the AoD 525, the process of measuring a phase difference among a plurality of linear antennas within an antenna array may be similar but, in this embodiment, the device roles are swapped (e.g., the roles of the information handling system 510 and BT enabled 5G access point 500 are swapped). In determining the AoD 525, the device being tracked may use only one antenna, and the transmitter device may use multiple antennas. The transmitter device sequentially switches the transmitting antenna, and the receiving side knows the antenna array configuration and switching sequence. It may be appreciated that, in determining the AoA and AoD 525 as described herein, the information handling system may be the receiving device 500, the BT enabled 5G access point may be the transmitting device 510, or the information handling system and BT enabled 5G access point may share in the transmissions and receptions of the RF EM waves to determine both or either of the AoA or AoD 525.

In an embodiment, the antenna array 515 may be placed in a linear arrangement and the RF EM waves may be received at the BT enabled 5G access point 500 as a planar wave front. In this embodiment, the sine wave emitted by every antenna at the information handling system 510 and received at the BT enabled 5G access point antenna will detect the incoming signal in the same phase when the transmitting antenna of the BT enabled 5G access point 500 lies on a normal plane perpendicular to the linear antenna array 515 of the information handling system 510. Where the transmitting antennas 515 of the information handling system 500 does not lie on a normal plane perpendicular to the linear BT enabled 5G access point antenna, the antenna of the BT enabled 5G access point will each detect a phase difference amongst themselves from the linear antenna array 515 of the information handling system 500. This phase difference data may be used to calculate the data related to the AoD 525. In an embodiment, the data related to the AoD 525 may be relayed back to the information handling system 500 for the information handling system 500 to calculate the AoD 525. Then the AoD 525 determined between the information handling system and the BT enabled 5G access point 500 may be used as an initial seed angle for conducting a beamsweeping process of measurement for node angles of the array of mm-wave antennas. The beamsweeping process and measurements may be conducted by the information handling system 510 according to an embodiment herein. Further, the beamsteering module of the information handling system 510 may select a beamsteering pattern that is optimized for signal quality or meets a threshold level of signal quality as described herein. In an embodiment, the BT enabled 5G access point antenna may use an RF switch (not shown) to take samples of transmissions of each of the information handling system antenna array 515. These samples are called "IQ-samples" since a sample pair of "In-phase" and "Quadrature-phase" readings are taken from the same receiving antenna and originating at the antenna array 515 of information handling system 510. Again, this I/Q data may be sent to the information handling system 510 for calculation of the AoD angle 525 and as an initial angle seed value for beamsteering pattern determination by the information handling system 510 to initiate a mm-wave communication with the BT enabled 5G access point 500.

While determining the data related to the AoD 525, the receiving device (e.g., the BT enabled 5G access point 500 or information handling system in other embodiments) is able to calculate its own position in space using angles from multiple beacons and their positions (e.g., by triangulation). In data related to the AoA 415 as described in connection with FIG. 4, the receiving device (e.g., information handling system or the BT enabled 5G access point 500) tracks arrival angles for individual objects. However, the present description contemplates that different combinations of these can be performed; so, these techniques do not limit what can be done at the application level. In both instances of determining the AoA 420 and AoD 525 data, the related control data is sent wirelessly to either of the information handling system 510 or BT enabled 5G access point 500. In these embodiment techniques, the processes may achieve a couple of degrees angular accuracy at around 0.5-meter location accuracy but such accuracy may be dependent on the implementation of the information handling system 510 and BT enabled 5G access point 500.

While the above-described embodiment of FIG. 5 describes a BT enabled 5G access point as receiver 500 and the information handling system 510 transmitting and conducting assessment of angle 525 via BT link module as well as selection of beamsteering pattern via a beamsteering module, it is contemplated that the transmitter 510 and receiver 500 roles be reversed between the BT enabled 5G access point and information handling system. In embodiments herein, either the information handling system or the BT enabled 5G access point may be used with a BT link module to obtain the AoD 525 for an initial seed angle for beamsweeping. In further embodiments herein, either the information handling system or the BT enabled 5G access point may be used with a beamsteering module to conduct a beamsweeping process and measurement to select a beamsteering pattern.

Figure 6:
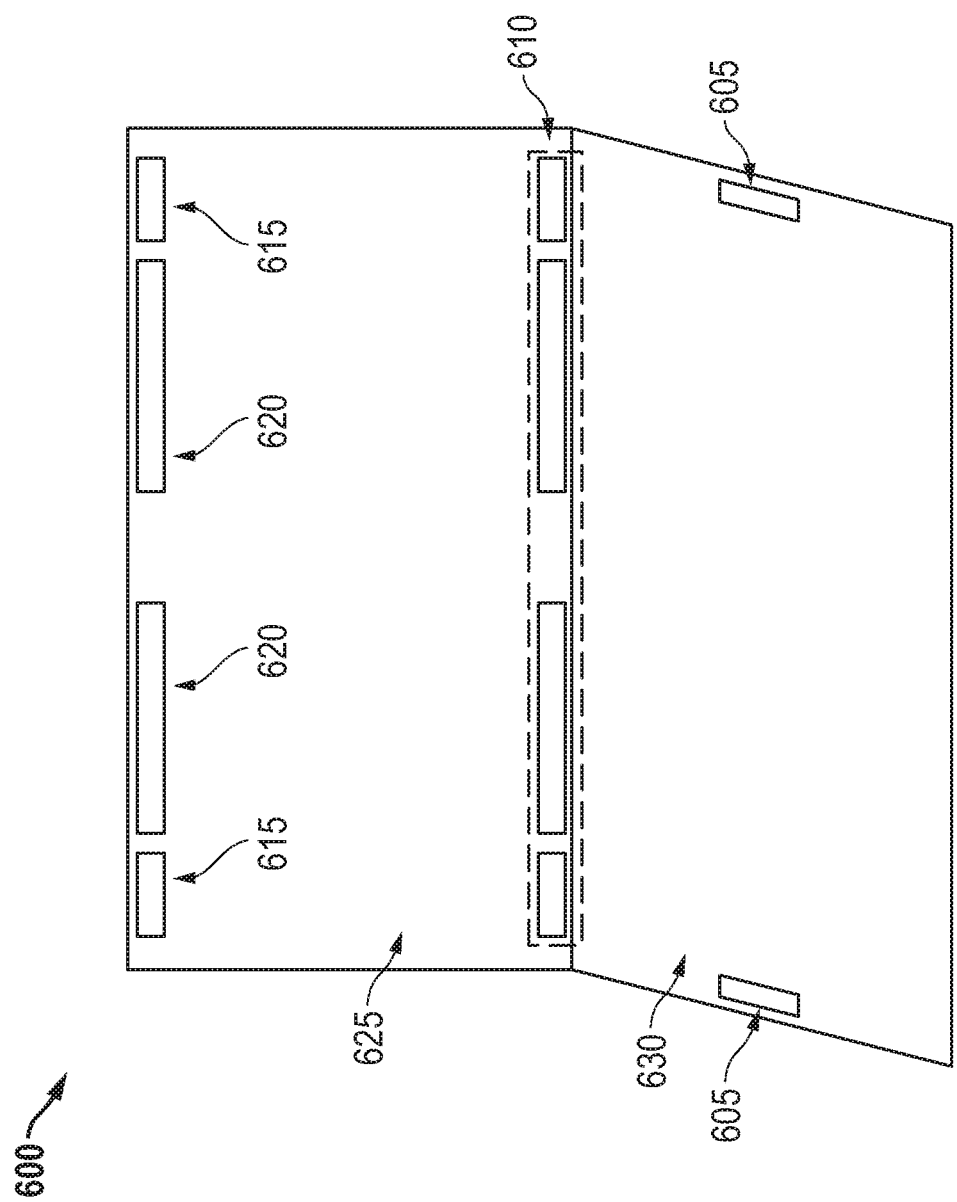
FIG. 6 is a block diagram illustrating an information handling system according to an embodiment of the present disclosure.

FIG. 6 is a graphical block diagram illustrating an information handling system 600 according to an embodiment of the present disclosure. The information handling system 600 of FIG. 6 shows the information handling system 600 in the form of a laptop computer. Although FIG. 6 shows the information handling system 600 as being a laptop computer, the present specification contemplates that the information handling system 600 may be any type of computing device or other information handling system as described herein.

FIG. 6 depicts potential locations of the array of sub-six GHz antennas 610, 620 and potential locations of the array of mm-wave antennas 605, 615. Although, the present description illustrates specific locations within the information handling system 600 of the array of sub-six GHz antennas and array of mm-wave antennas, the present description contemplates that other locations within the information handling system 600 are contemplated as locations within the information handling system 600 where these arrays may be placed.

In an embodiment, an array of sub-six GHz antennas 620 may be placed at a top edge of a display portion 625 of the information handling system 600. At this location, the array of sub-six GHz antennas 620 may be allowed to freely transmit to, for example, an BT enabled 5G access points. The array of sub-six GHz antennas 620 may, in an embodiment, communicate with the BT enabled 5G access point using a BT communication protocol such as BT 5.1.

Additionally, or in an alternative embodiment, an array of sub-six GHz antennas 610 may be placed below a display formed within the display chassis 625 of the information handling system 600. In an embodiment, the bevel formed along the display of the display chassis 625 may house the array of sub-six GHz antennas 610. Alternatively, the array of sub-six GHz antennas 610 may be placed at or within a hinge formed between the display chassis 625 and the base chassis 630.

In an embodiment, the array of sub-six GHz antennas 610, 620 may emit a broad band of RF EM waves that include those RF EM frequencies used to communicate with the BT enabled 5G access point via a BT communication protocol. In an embodiment, the array of sub-six GHz antennas 610, 620 may be used to also emit 5G band frequencies. In these embodiments, the array of sub-six GHz antennas may emit frequencies ranging from ~0.6 GHz to 6 GHz that may be shared between Wi-Fi, BT, GNSS, LTE/LTE-A and new 5G radio access technologies. The sharing of the array of sub-six GHz antennas between multiple wireless technologies may reduce the number of antennas used within the information handling system 600 thereby increasing the space available within the display chassis 625 or display chassis 630 for other components and devices. In an embodiment, the array of sub-six GHz antennas 610 or 620 may include a 4×4 MIMO array of antennas that may operate at 5G frequencies between, in an example, 3 and 6 GHz. Additionally, in some embodiments, the array of sub-six GHz antennas 610 or 620 may be integrated with a radio front-end as described herein to decrease the footprint of the array of sub-six GHz antennas within the information handling system 600. The radio front ends may tune the array of sub-six GHz antennas to emit those RF EM frequencies to perform any one or more of the methods or computer-based functions disclosed herein.

In an embodiment, the locations of an array of >6 GHz mm-wave antennas 605, 615 may be along any of a top portion of the display chassis 625 such as mm-wave antenna array 615, side portions of the base chassis 630 such as mm-wave antenna array 605, or a bottom portion of the display chassis 625 similar to the array of sub-six GHz antennas as shown in FIG. 6. In an embodiment, the array of mm-wave antennas may emit mm-wave frequencies or those RF EM frequencies that are greater than 6 GHz.

In an embodiment, the antennas of the array of mm-wave antennas 605, 615 may leverage WiGig wireless network protocols that include IEEE 802.11ad and IEEE 802.11ay standards in some examples. The use of the WiGig wireless network protocols may allow the information handling system 600 to communicate with the BT enabled 5G access point wirelessly at multi-gigabit speeds. This may allow the information handling system 600 to transmit large amounts of data to and from the BT enabled 5G access point thereby increasing the functionality of the information handling system 600. However, despite improved bandwidths, these higher frequencies of mm-wave communications at the >6 GHz mm-wave antenna arrays suffer from limitations on range and additionally may be susceptible to substantial interference from objects such as walls or the like when line of sight transmission and reception is not available. Thus, the beamforming or beamsteering processes of embodiments herein are used for directionality between an array of mm-wave antennas such as 605 or 615 and a receiver at a BT enabled 5G access point, for example, to improve operation along a mm-wave wireless connection at these frequency ranges.

In an embodiment, multiple arrays of mm-wave antennas 605 and 615 may be placed throughout the information handling system 600. The use of these multiple arrays of mm-wave antennas may increase the gain and angular coverage of the arrays of mm-wave antennas during communication with the BT enabled 5G access points. This may further allow for the individual arrays of sub-six GHz antennas to consecutively handoff data transmissions to other BT enabled 5G access points if and when the position of the information handling system 600 changes and falls outside of a transmission range of any given BT enabled 5G access points.

The placement of any of the array of mm-wave antennas 605 or 615 or array of sub-six GHz antennas 610 or 620 may be selected to accommodate for any specific absorption rate (SAR) considerations. Each of the antennas included in the information handling system 600, in any embodiment, may be subject to the FCC regulations on specific absorption rate (SAR). As such, the placement of the array of sub-six GHz antennas and, in particular, the array of mm-wave antennas may be such that the SAR is reduced.

Figure 7:
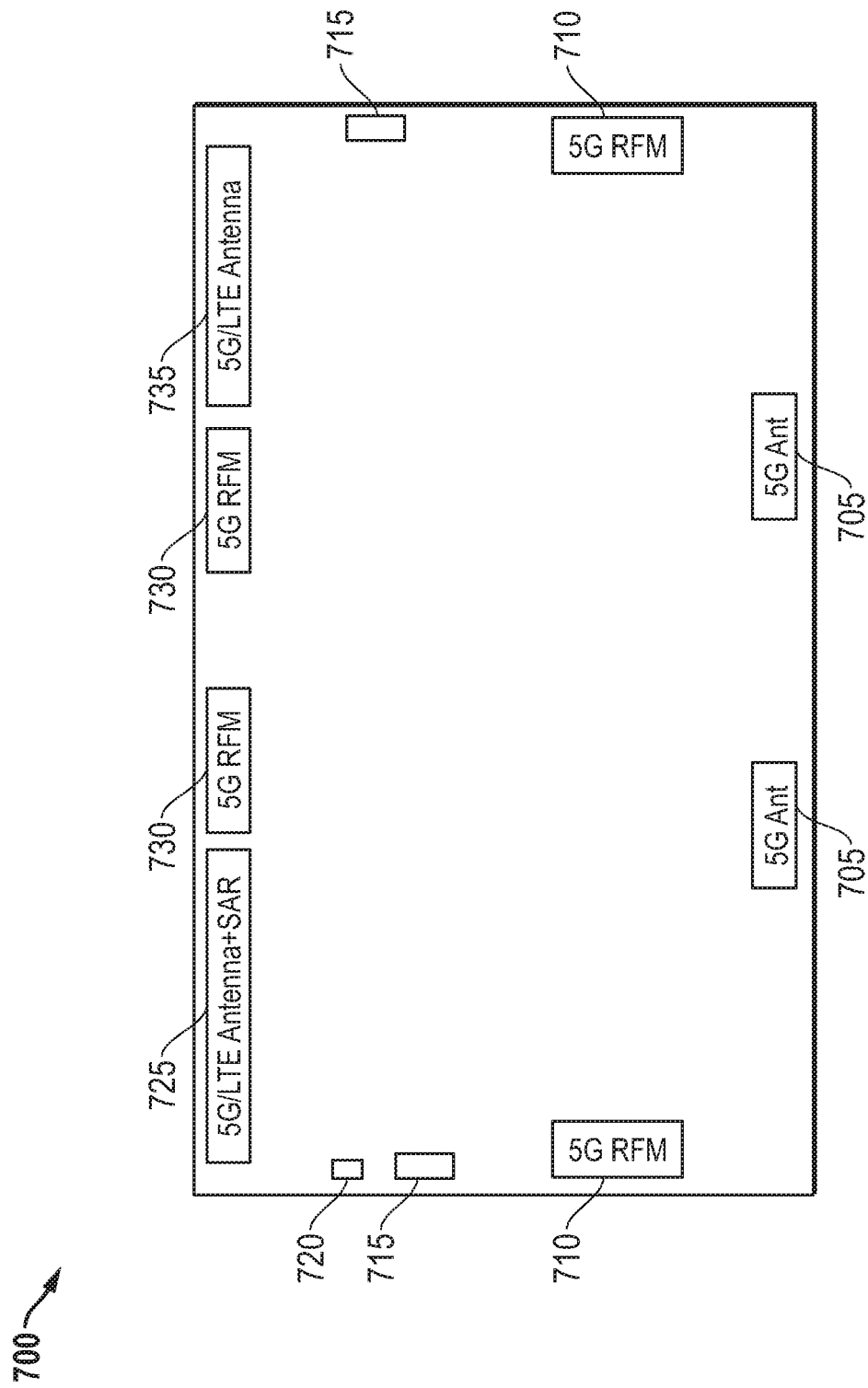
FIG. 7 is a block diagram illustrating an information handling system according to an embodiment of the present disclosure.

FIG. 7 is a graphical block diagram illustrating an information handling system 700 according to an embodiment of the present disclosure. The information handling system 700 of FIG. 7 shows the information handling system 700 in the form of a tablet computer. Although FIG. 7 shows the information handling system 700 as being a tablet computer, the present specification contemplates that the information handling system 700 may be any type of computing device or other information handling system as described herein.

FIG. 7 illustrates potential locations of the array of sub-six GHz antennas and potential locations of the array of mm-wave antennas according to several embodiments described herein. Although the present description illustrates specific locations within the information handling system 700 of the array of sub-six GHz antennas and array of mm-wave antennas, the present description contemplates that other locations within the information handling system 700 are contemplated as locations within the information handling system 700 where these arrays may be placed.

In an embodiment, the information handling system 700 may include a number of 5G antennas or antenna arrays 705, 710, 725, 730, 735. The 5G antennas or antenna arrays 705, 710, 725, 730, 735 may be located at a bottom edge. side edge, and/or top edge of the information handling system 700. In an embodiment, the 5G antennas or antenna arrays 705 may emit RF EM frequencies at 4 GHz. In this embodiment, the 5G antennas or antenna arrays 705 may be included with an array of Wi-Fi antennas for 5G 4×4 MIMO transmissions. This may be done so as to consolidate the space used within the tablet information handling system 700 as depicted in FIG. 7.

In an embodiment, the 5G antennas or antenna arrays 725, 735 may emit RF EM frequencies at GNSS bands and 4 GHz band for 5G/LTE or LTE+GNSS transmissions. In this embodiment, the 5G antennas or antenna arrays 725, 735 may include a SAR sensor to detect the SAR of the emission of these 5G antennas or antenna arrays 725, 735. The 5G antennas or antenna arrays 725, 735 may be tunable for size reduction and performance within the information handling system 700. The 5G antennas or antenna arrays 725, 735 may emit broader bands of 4 GHz due to the use of various resonance frequencies potentially produced by the 5G antennas or antenna arrays 725, 735. In an embodiment, the 5G antennas or antenna arrays 725, 735 may be communicatively coupled to an LTE or 5G RF front end via a multiplexed or separate feed. The 5G antennas or antenna arrays 725, 735 may, in an embodiment, also be configured to switch to emit RF EM frequencies related to citizens broadband radio service (CBRS) frequencies such as 3.5 GHz LTE. In an embodiment, the 5G antennas or antenna arrays 725, 735 may be emit a broader RF EM band that includes 5 GHz license assisted access (LAA) bands.

In an embodiment, the 5G antennas or antenna arrays 730 may be a centimeter-wave (cm-wave) two-dimensional (2D) phased antenna array that emits RF EM waves at a frequency of 28 GHz. In an embodiment where no RF EM frequency diversity or line-of-sight blockage is anticipated, the 5G mm-wave 2D phased antenna arrays 730 may be eliminated from the information handling system 700 to provide more space therein for other components or elements.

In an embodiment, the information handling system 700 may include an array of GNSS antennas 720. The array of GNSS antennas 720 may emit those RF EM frequencies associated with any global navigation satellite system protocols as described herein. In an embodiment, the array of GNSS antennas 720 may be included with Wi-Fi or 5G/LTE antenna arrays so as to consolidate space within the information handling system 700.

In an embodiment, the information handling system 700 may include an array of Wi-Fi and BT antennas 715. The Wi-Fi and BT antennas 715 may emit RF EM frequencies that cover 2.4 GHz and 5 GHz bands. In an embodiment, the Wi-Fi and BT antennas 715 may be included with 5G antennas or antenna arrays 705 so as to consolidate space within the information handling system 700.

In an embodiment, the information handling system 700 may include a plurality of 5G mm-wave 2D phased antenna arrays 710. The 5G mm-wave 2D phased antenna arrays 710 may emit RF EM waves from 64 GHz to 71 GHz bands. In an embodiment, the 5G mm-wave 2D phased antenna arrays 710 may leverage WiGig wireless network protocols that include IEEE 802.11ad and IEEE 802.11ay standards. In an embodiment where no RF EM frequency diversity or line-of-sight blockage is anticipated, the 5G mm-wave 2D phased antenna arrays 710 may be eliminated from the information handling system 700 to provide more space therein for other components or elements.

Figure 8:
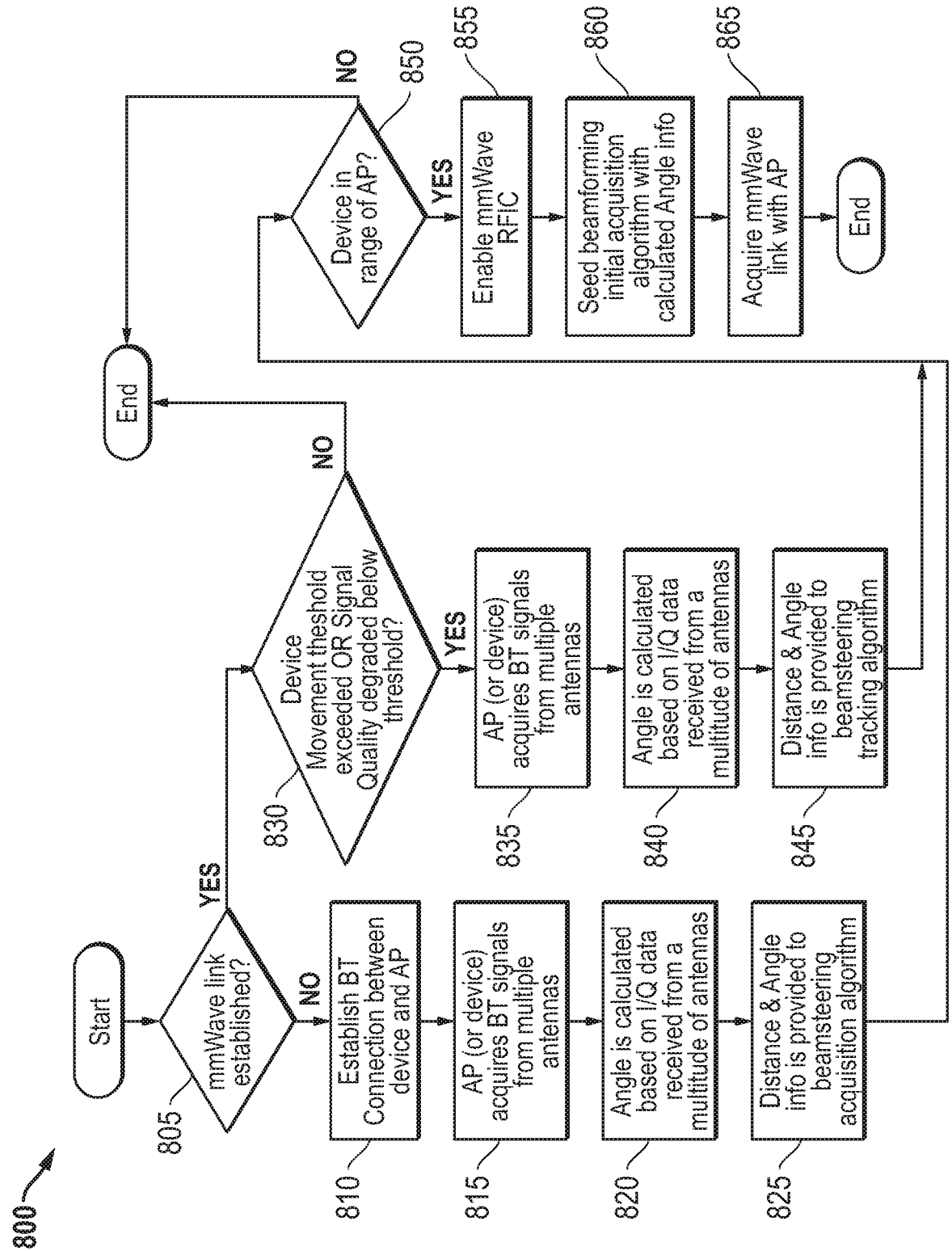
FIG. 8 is a flow diagram illustrating a method of establishing a millimeter-wave connection with a Bluetooth (BT) enabled 5G access point at an information handling system according to an embodiment of the present disclosure.

FIG. 8 is a flow diagram illustrating a method 800 of establishing a millimeter-wave connection with an BT enabled 5G access point at an information handling system according to an embodiment of the present disclosure. The method 800 may include determining, at block 805, whether a mm-wave link or communication has been established by the information handling system to an BT enabled 5G access points. The establishment of the mm-wave link by the information handling system to the BT enabled 5G access point may be accomplished using any of the arrays of mm-wave antennas described herein.

Where a mm-wave link has been established between the information handling system and the BT enabled 5G access point, YES decision at block 805, a determination may be made at block 830 relative to movement or change in angle between the information handling system and BT enabled 5G access point as to whether the information handling system has moved beyond a threshold distance from an BT enabled 5G access point and/or whether a signal quality from the BT enabled 5G access point and detected by the information handling system has degraded below a threshold level.

Where the information handling system has not been moved past the threshold distance and the signal quality has not degraded past the threshold, NO determination at block 830, the method 800 may continue to iteratively make the decisions at block 805 and 830 until the status of the information handling system has changed. In an embodiment, the decisions made at block 830 may be conducted using a sub-six GHz antenna array that implements BT 5.1 protocols to determine the location of the information handling system relative to the BT enabled 5G access point as described herein. The signal quality threshold may be assessed by detecting >6 GHz mm-wave antenna array operations as monitored and detected during operation of the mm-wave connection. For example, a baseband processor may monitor signal to noise ratios, bit error rates, interference levels, received signal strength, or other metrics relating to signal quality during operation.

Where the information handling system has been moved past the threshold distance or the signal quality has degraded past the threshold (YES determination at block 830) the method 800 may continue, at block 835, with the information handling system sending or acquiring BT signals from an array of sub-six GHz antennas at a BT enabled 5G access point or the BT enabled 5G access point antennas sending or acquiring BT signals from the information handling system in accordance with embodiments described herein to determine AoA or AoD determinations. Sufficient changes in angle between the information handling system and the BT enabled 5G access point may require a readjustment to the existing beamsteering pattern operating for continuing mm-wave communications. As described herein, the information handling system alternatively may be sufficiently far away from one BT enabled 5G access point to prompt the information handling system to acquire a new mm-wave link with another new BT enabled 5G access point for continued mm-wave communications. When either situation occurs, the protocols associated with BT 5.1 may be used to determine I/Q data (e.g., angle data and distance data) descriptive of the placement or angle of the information handling system relative to the current or new BT enabled 5G access points.

At block 840, the method 800 may include calculating an angle of the information handling system relative to the BT enabled 5G access point based on the I/Q data received from the plurality of antennas at the BT enabled 5G access point. As described herein, the I/Q data is descriptive of any changes in magnitude or amplitude as well as a phase of a sine wave received by the antennas of the BT enabled 5G access points. This I/Q data may be used to determine or calculate angle data descriptive of an angle of the information handling system relative to the BT enabled 5G access point in a three-dimensional space. Similarly, distance data may be calculated using, for example, ToF data.

The method 800 may include, at block 845, providing distance and angle data to a beamsteering module that calculates an adjusted beamsteering pattern from the information handling system to the BT enabled 5G access point to track ongoing mm-wave communication with the BT enabled 5G access point. The beamsteering module may implement any process, method, or algorithm in order to cause the RF EM waves emitted by the mm-wave antenna array to be directed to the BT enabled 5G access point for the mm-wave communication link. In an embodiment, the continuation of the mm-wave link between the information handling system and BT enabled 5G access point may end the method 800 described herein. In an embodiment, the method 800 may continue back at block 805 with iteratively determining whether a mm-wave link has been established or is maintained between the information handling system and BT enabled 5G access point for periodic or iterative beamsteering tracking.

Where a mm-wave link has not been established between the information handling system and the BT enabled 5G access points, NO decision at block 805, the method 800 may proceed to block 810 to establish a BT connection between the information handling system and the BT enabled 5G access point. In an embodiment, the BT connection may be established using an array of sub-six antennas that operate under frequencies associated with a BT 5.1 protocol as described herein.

The method 800 may continue at block 815 with the information handling system acquiring BT signals from multiple antennas at the BT enabled 5G access point or at the information handling system according to embodiments herein. At block 820, a BT enabled 5G access point or the information handling system may determine an angle of the information handling system relative to the BT enabled 5G access point based on I/Q data created upon acquisition of those BT signals at the BT enabled 5G access point or information handling system. In an embodiment, a BT link module of the information handling system may calculate the angle data upon receipt of the I/Q data from the BT enabled 5G access point via a data transmission. The relative angle between the information handling system and BT enabled 5G access point may be calculated according to BT protocols for determining AoA or AoD as described in methods herein. The determination of the relative angle may be conducted at either the information handling system or the BT enabled 5G access point and transmitted to the device responsible for conducting beamsteering processes such as the beamsweeping process for beamforming initialization. In an embodiment, the BT link module may also calculate distance data descriptive of a distance of the information handling system from the BT enabled 5G access point using, for example, ToF data received from the BT enabled 5G access point by the information handling system.

The method 800 may continue with providing the distance data and angle data to, in an embodiment, a beamsteering module that calculates a beamsteering pattern between the information handling system and the BT enabled 5G access point to initiate beamsteering acquisition for mm-wave communication between antenna systems on both devices under 5G mm-wave frequency communication bands at block 825. The beamsteering module may implement any process, method, or algorithm in order to cause the RF EM waves emitted by the mm-wave antenna array to be directed and altered to initiate a mm-wave link between the information handling system and the BT enabled 5G access point as described further herein.

The method 800 may continue, at block 850, with a decision as to whether the information handling system is within range of the BT enabled 5G access points. Where it is determined that the information handling system is not within range of the BT enabled 5G access point (NO decision at block 850), the method 800 may continue back at block 805 with iteratively determining whether a mm-wave link has been established between the information handling system and the BT enabled 5G access point and, if not, preparing to initiate the beamsteering acquisition process with a different BT enabled 5G access point.

Where it is determined that the information handling system is within range of the BT enabled 5G access point YES decision at block 850), the method 800 may continue at block 855 with enabling the mm-wave RF IC described herein to conduct a beamsweeping process to check and measure multiple node angles for directionality of the 5G mm-wave antenna arrays. Proceeding to block 860, the beamforming process used may adopt the relative angle determined by the BT link module between the information handling system and the BT enabled 5G access point as an initial seed angle for the beamsweeping process phase in assessing plural antenna array node angles in the mm-wave spectrum. This initial beamforming algorithm for conducting a beamsweeping may operate to iteratively assess node angles in various zones and compare those spot checked angles with the initial seed angle zone to find a suitable beamsteering pattern. With the initial seed angle, zones of node angles may be eliminated by comparison thus potentially reducing several among thousands of potential node angles to be scanned in a beamsweeping algorithm.

Other embodiments may also include sending any angle data, distance data, I/Q data to a BT enabled 5G access point to direct the array of mm-wave antennas of the BT enabled 5G access point toward the information handling system or vice-versa during any beam sweeping phase engage in by the beamforming process at either the information handling system or the BT enabled 5G access point. The beamsteering process may use the initial seed angle to simplify the scan and measurement of signal quality at a plurality of node angles as compared to the node at an initial seed angle. In other embodiments, the initial seed angle may provide a direction in which to begin a beamsweeping process such that opposite directions may not need to be checked when a beamsteering pattern with sufficient signal quality is discovered. According to the above, the beamsteering node may select a beamsteering node pattern with an optimizes signal quality level or one that meets a signal quality threshold level. The method 800 may then proceed to block 865 with acquiring the mm-wave link between the information handling system and the BT enabled 5G access points.

The method 800 is described herein from the perspective of the information handling system. For example, the information handling system may make the decisions at blocks 805, 830, and 850 as well as make the calculations at blocks 820, 825, 840, 845 by executing computer readable program code maintained on the memory devices of the information handling system. The information handling system may also execute a beamsteering module to implement a mm-wave connection as described in blocks 855, 860 and 865 in some embodiments. In alternative embodiments, the BT enabled 5G access point may make these decisions and execute this computer readable program code so as to establish a mm-wave link from the BT enabled 5G access point to the information handling system via a BT link module and beamsteering module. As such, the present disclosure contemplates that the processes, methods, and algorithms used to establish the mm-wave link between the information handling system and BT enabled 5G access point may be conducted by any information handling system; the BT enabled 5G access point with a processing device included.

Figure 9:
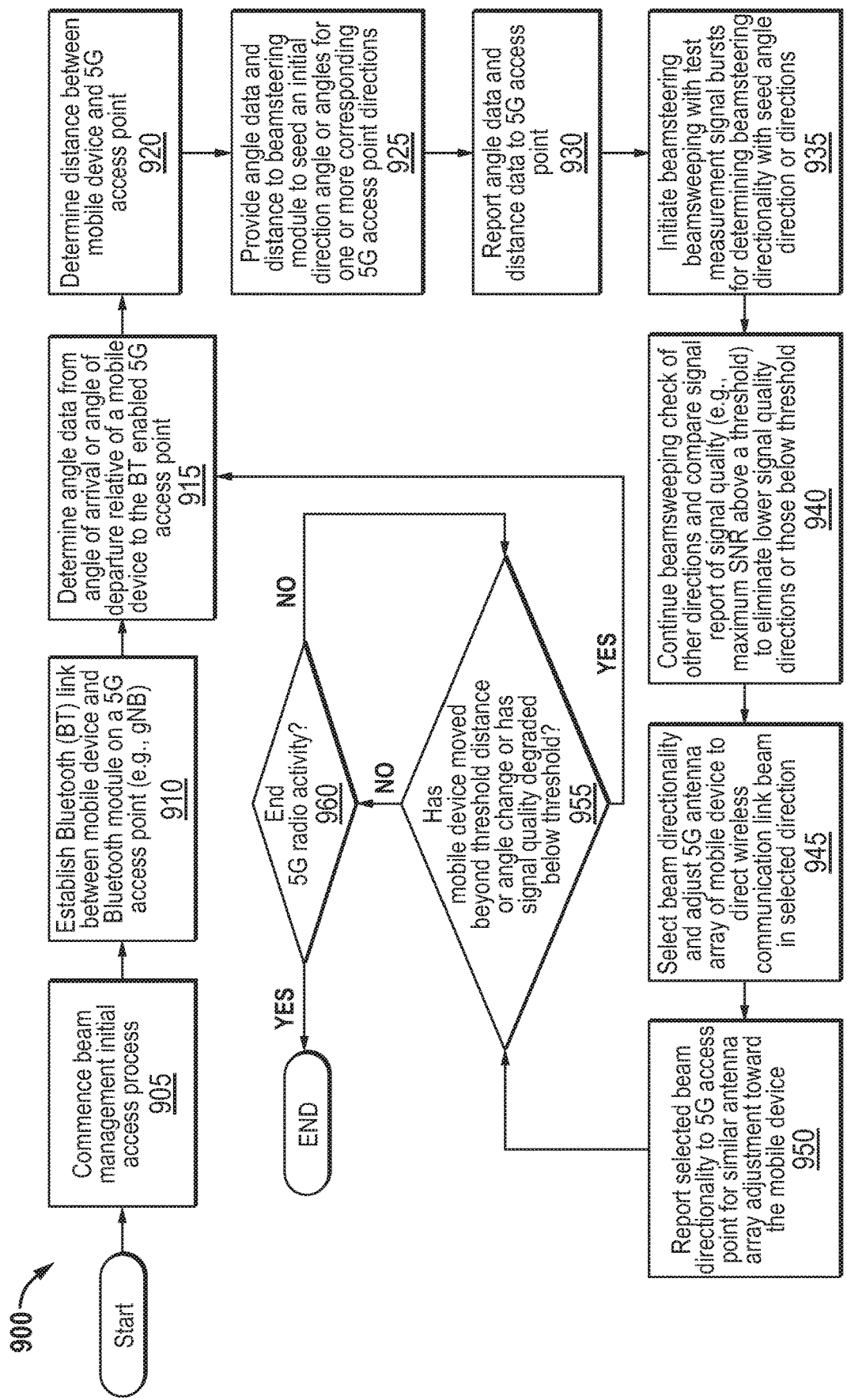
FIG. 9 is a flow diagram illustrating a method of establishing a millimeter-wave connection with a BT enabled 5G access point at an information handling system according to another embodiment of the present disclosure.

FIG. 9 is a flow diagram illustrating a method 900 of establishing a millimeter-wave connection with a BT enabled 5G access point at an information handling system according to an embodiment of the present disclosure. The method 900 may include, at block 905 with commencing with a beam management initial access process. This process may include, in an embodiment, establishing a BT link between a mobile device and BT link module on a BT enabled 5G access point (e.g., gNB) at block 910. In the embodiment of FIG. 9, the mobile information handling system device may initiate the establishing of the BT link using one sub-six GHz antenna or a sub-six GHz antenna array. In an embodiment, the BT link may be established using a BT 5.1 protocol. As described herein, the BT 5.1 protocol may be used to determine the location of the mobile device (i.e., an information handling system) relative to a BT enabled 5G access points. In these embodiments, the BT enabled 5G access point includes a plurality of sub-six GHz BT antennas that create I/Q data used to calculate an angle of the mobile device relative to the BT enabled 5G access point.

The method 900 may continue at block 915 with determining angle data from the AoA or AoD determinations related to the position and angle of the mobile device to the BT enabled 5G access points. As such, this determination at block 915 may include calculating an angle of the mobile device relative to the BT enabled 5G access point based on the I/Q data received from the plurality of BT antennas at the BT enabled 5G access point or via a plurality of antennas at the mobile information handling system. As described herein, the I/Q data is descriptive of any changes in magnitude or amplitude as well as a phase of a sine wave received by the BT antennas of the BT enabled 5G access points. This I/Q data may be used to determine or calculate angle data descriptive of an angle of the mobile device to the BT enabled 5G access point in a three-dimensional space.

The method 900 also includes determining a distance between the BT enabled 5G access point and the mobile device at block 920. In an embodiment, the distance data may be calculated using, for example, ToF data received at the BT enabled 5G access point from the mobile device. In an embodiment, the initiating signals from the mobile device may include packet data descriptive of the time the packet was sent. By comparing that timestamp to a current time, the BT enabled 5G access point may calculate the distance the signal traveled using ToF calculations.

The method 900 may continue with providing the distance and the angle data to a beamsteering module of the mobile device to seed an initial direction angle or angles for one or more corresponding BT enabled 5G access point directions at block 925. In an embodiment, the mobile device may execute any process or algorithm that causes the main lobes of the radiation patterns produced by a mm-wave antenna or array of mm-antennas of the mobile device to be altered to point towards one of many determined locations of BT enabled 5G access points. Once a direction towards a BT enabled 5G access point has been discovered, the mobile device may transmit the angle data and distance data to any or all of the detected BT enabled 5G access points so that a mm-wave antenna or array of mm-wave antennas at the BT enabled 5G access point may also engage in the beamsteering process previously conducted at the mobile device.

The method 900 may continue with initiating, at block 935, beamsteering beamsweeping with test measurement signal bursts for determining beamsteering directionality starting with the initial seed angle direction or directions. The beamsteering beamsweeping process may include, at block 940, continuing to check other directions where BT enabled 5G access point locations have been detected and comparing signal reports related to the signal quality (e.g., maximum SNR above a threshold) between the mobile device and BT enabled 5G access points in order to eliminate lower signal quality directions or those directions that have a signal quality below a threshold. This process ensures that the most reliable connection between the mobile device and BT enabled 5G access point is achieved. By selecting the most reliable connection between the mobile device and BT enabled 5G access points, the relatively shorter mm-wave frequencies produced by the mm-wave antennas may reach the mobile device or BT enabled 5G access point during packet transmissions.

The method 900 may continue at block 945 with selecting the beam directionality having the most reliable connection and adjusting the 5G antenna array within the mobile device to direct the wireless communication link beam in the selected direction towards the selected BT enabled 5G access points as a selected beamsteering pattern of the 5G mm-wave antenna array. Similarly, the mobile device, at block 950, may report the selected beam directionally to the selected BT enabled 5G access point so that the 5G antenna arrays at the BT enabled 5G access point may be adjusted to point toward the mobile device in a reciprocal beamsteering pattern. This ensures that the best 5G communication may occur between the mobile device and the BT enabled 5G access points.

The method 900 continues at block 955 with deciding whether the mobile device has moved beyond a threshold distance, whether the AoA or AoD has changed, or whether the signal quality between the BT enabled 5G access point and the mobile device has degraded below a threshold during ongoing or iterative beamsteering tracking. Because the mobile device is mobile and may be transported into and out of a plurality of signal areas of a plurality of BT enabled 5G access points, the signal quality may change due to changes in the AoA/AoD angle data, and or distance of the mobile device relative to the BT enabled 5G access points.

Where it is determined that, YES at block 955, the mobile device has moved beyond a threshold distance, the AoA or AoD has changed, or the signal quality between the BT enabled 5G access point and the mobile device has degraded below a threshold, the method 900 may proceed again at block 915 and recalculate an new AoA or AoD for angle data and proceeding with a new negotiation between the mobile device and BT enabled 5G access point as described herein. This renegotiation may also include the beamsteering and beamsweeping processes as descried herein.

Where it is determined that, NO at block 955, the mobile device has not moved beyond a threshold distance, the AoA or AoD has not changed, or the signal quality between the BT enabled 5G access point and the mobile device has not degraded below a threshold, the method 900 continues with determining whether the 5G radio activity is to end at block 960. Where the 5G communication is to be maintained by the mobile device (NO determination at block 960), the method 900 may iteratively determine whether the mobile device has moved beyond a threshold distance, the AoA or AoD has changed, or the signal quality between the BT enabled 5G access point and the mobile device has degraded below a threshold by returning to decision block 955. Where the 5G communication is not to be maintained by the mobile device (YES determination at block 960), the method 900 may end. In an embodiment, any number of triggering events may allow the mobile device to determine that the 5G communication is not to be maintained by the mobile device. These triggering events may include shutting down of the mobile device, turning off of the mm-wave antennas, and power loss to the mobile device, among others.

Figure 10:
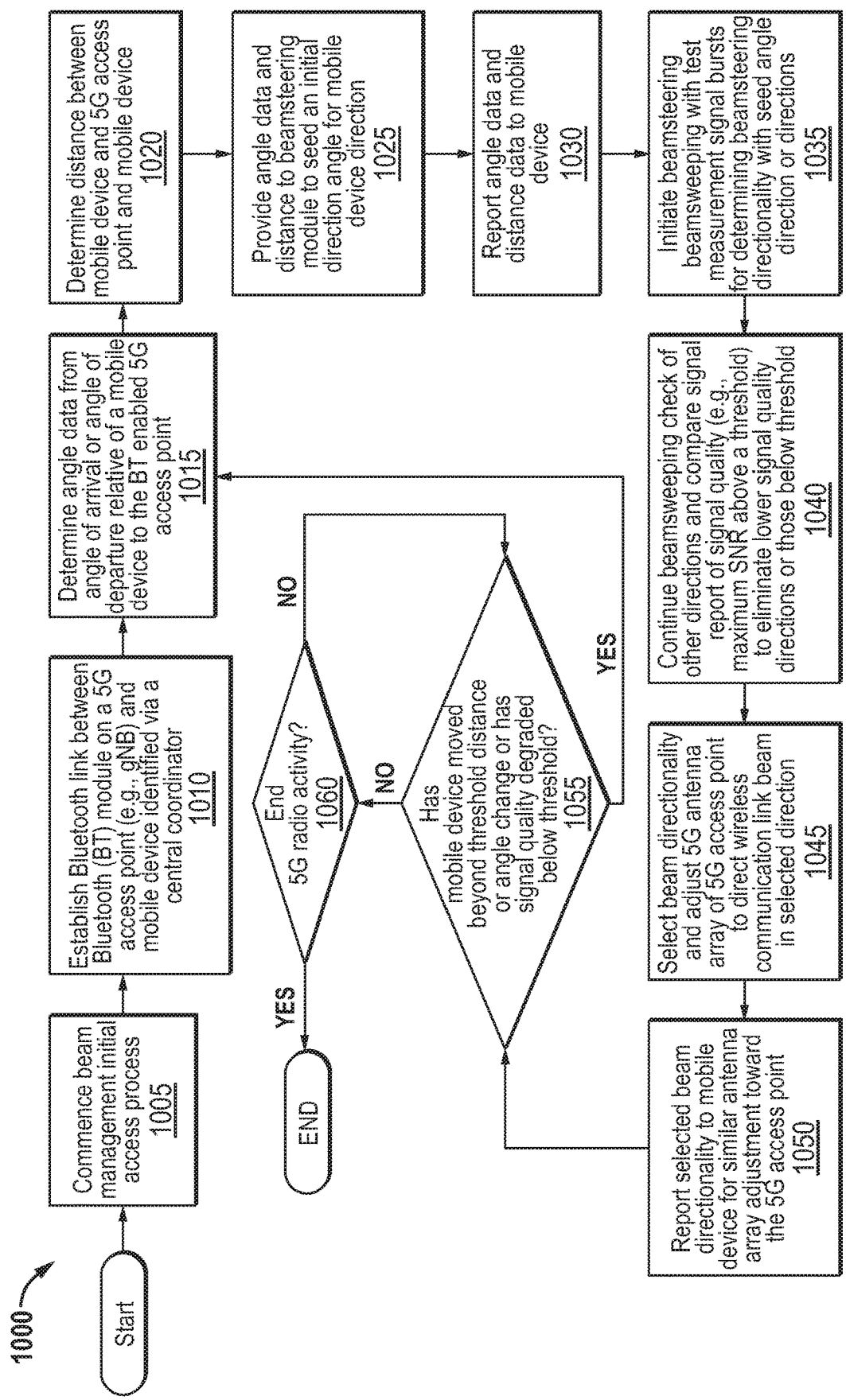
FIG. 10 is a flow diagram illustrating a method of establishing a millimeter-wave connection at an information handling system with a BT enabled 5G access point according to yet another embodiment of the present disclosure.

FIG. 10 is a flow diagram illustrating a method 1000 of establishing a millimeter-wave connection with a BT enabled 5G access point at an information handling system according to an embodiment of the present disclosure. The method 1000 may include, at block 1005 with commencing with a beam management initial access process. This process may include, in an embodiment, with establishing a BT link between a mobile device and BT link module on a BT enabled 5G access point (e.g., gNB) at block 1010. This process may include the identification of the mobile device, at block 1010, via a central coordinator. The central coordinator may be used to coordinate the mm-wave communication between one of the plurality of BT enabled 5G access points and a plurality of mobile devices. In the embodiment of FIG. 10, the BT enabled 5G access point may initiate the establishing of the BT link using one sub-six GHz antenna or a sub-six GHz antenna array. In an embodiment, the BT link may be established using a BT 5.1 protocol. As described herein, the BT 5.1 protocol may be used to determine the location of the mobile device (i.e., an information handling system) relative to a BT enabled 5G access points. In these embodiments, the BT enabled 5G access point includes a plurality of sub-six GHz BT antennas that create I/Q data used to calculate an angle of the mobile device relative to the BT enabled 5G access point.

The method 1000 may continue at block 1015 with determining angle data from the AoA or AoD related to the position of the mobile device to the BT enabled 5G access points. As such, this determination at block 1015 may include calculating an angle of the mobile device relative to the BT enabled 5G access point based on the I/Q data received from or sent to the plurality of BT antennas at the BT enabled 5G access point or received from or sent to the plurality of BT antennas at the mobile information handling system. As described herein, the I/Q data is descriptive of any changes in magnitude or amplitude as well as a phase of a sine wave received by the BT antennas of the BT enabled 5G access points or at the information handling system. This I/Q data may be used to determine or calculate angle data descriptive of an angle of the mobile device to the BT enabled 5G access point in a three-dimensional space.

The method 1000 also includes determining a distance between the BT enabled 5G access point and the mobile device at block 1020. In an embodiment, the distance data may be calculated using, for example, ToF data received at the BT enabled 5G access point from the mobile device. In an embodiment, the initiating signals from the mobile information handling system device may include packet data descriptive of the time the packet was sent. By comparing that timestamp to a current time, the BT enabled 5G access point may calculate the distance the signal traveled using ToF calculations.

The method 1000 may continue with providing the distance and the angle data to a beamsteering module of the mobile device to seed an initial direction angle or angles for one or more corresponding BT enabled 5G access point directions at block 1025. In an embodiment, the mobile device may execute any process or algorithm that causes the main lobes of the radiation patterns produced by a mm-wave antenna or array of mm-antennas of the mobile device to be altered to point from the BT enabled 5G access point to a mobile information handling system during beamsweeping scanning of plural mm-wave antenna array lobe directions.

At block 1030, once a direction from a BT enabled 5G access point to a mobile information handling system has been discovered, the BT enabled 5G access point may transmit the angle data and distance data to the mobile information handling system so that a mm-wave antenna or array of mm-wave antennas at the mobile information handling system may also engage in the steering a beam toward the BT enabled 5G access point during beam scanning in an example embodiment.

The method 1000 may continue with initiating the beamsteering or beamforming algorithm at block 1035. A beamsweeping phase if initial beamforming acquisition may be conducted at the BT enabled 5G access point in an example embodiment with test measurement signal bursts at a plurality of beamsteering node directions starting with the seed angle direction or directions. The beamsweeping process may include, at block 1040, continuing to check other node directions by spot checking zones of node directions and comparing to the initial seed angle direction or by checking each node direction until a beamsteering pattern meeting a signal quality threshold such as a signal to noise ratio threshold is discovered. The beamsweeping process may detect and compare signal reports related to the signal quality (e.g., maximum SNR above a threshold) of multiple lobe angles between the BT enabled 5G access point and the mobile information handling system in order to eliminate lower signal quality directions or those directions that have a signal quality below a threshold. This process ensures that the most reliable connection between the mobile device and BT enabled 5G access point is achieved. By selecting the most reliable connection between the mobile device and BT enabled 5G access points, the relatively shorter mm-wave frequencies produced by the mm-wave antennas may reach the mobile device or BT enabled 5G access point during packet transmissions.

The method 1000 may continue at block 1045 with selecting the beam directionality having the most reliable connection and adjusting the 5G antenna array of the BT enabled 5G access point to direct the wireless communication link beam in the selected direction towards the mobile information handling system. Based on one or more of the above beamsweeping algorithms, the beamsteering module of the BT enabled 5G access point may select a beamsteering pattern to use with the 5G antenna array. Similarly, the mobile device, at block 950, may report the selected beam directionality of the selected beamsteering pattern to the mobile information handling system. With the received selection of BT enabled 5G access point beamsteering pattern, then the 5G antenna arrays at the mobile information handling system may be adjusted to reciprocally point a reciprocal beamsteering pattern toward the BT enabled 5G access point. This process may be repeated for multiple BT enabled 5G access point and mobile information handling systems when multiple BT enabled 5G access point options are within range of a mobile information handling system. This ensures that the best 5G communication may occur between the mobile device and the BT enabled 5G access points.

The method 1000 continues at block 1055 with the beamsteering module conducting iterative or ongoing beamforming tracking At block 1055, the beamsteering module will determine whether the mobile device has moved beyond a threshold distance, whether the AoA or AoD angle between the BT enabled 5G access point and the mobile information handling system has changed, or whether the signal quality between the BT enabled 5G access point and the mobile information handling system device has degraded below a threshold. Because the mobile device is mobile and may be transported into and out of a plurality of signal areas of a plurality of BT enabled 5G access points, the signal quality may change due to changes in the relative angle between the devices or distance of the mobile device relative to the BT enabled 5G access points.

Where it is determined that, YES at block 1055, the mobile device has moved beyond a threshold distance, the AoA or AoD relative angle has changed, or the signal quality between the BT enabled 5G access point and the mobile information handling system device has degraded below a threshold, the method 1000 may proceed again at block 1015 and recalculating an new AoA or AoD to determine relative angle between the devices and proceeding with a new negotiation between the mobile information handling system device and the BT enabled 5G access point to readjust the selected beamsteering pattern as described in embodiments herein. This renegotiation may also include the beamsteering and beamsweeping processes as described herein.

Where it is determined that, NO at block 1055, the mobile device has not moved beyond a threshold distance, the AoA or AoD has not changed, and the signal quality between the BT enabled 5G access point or the mobile device has not degraded below a threshold, the method 1000 continues with determining whether the 5G radio activity is to end at block 1060. Where the 5G communication is to be maintained by the mobile device (NO determination at block 1060), the method 1000 may return to block 1055 to iteratively or continue to determine whether the mobile device has moved beyond a threshold distance, the AoA or AoD has changed, or the signal quality between the BT enabled 5G access point and the mobile device has degraded below a threshold. Where the 5G communication is not to be maintained by the mobile device (YES determination at block 1060), the method 1000 may end. In an embodiment, any number of triggering events may allow the mobile device to determine that the 5G communication is not to be maintained by the mobile device. These triggering events may include shutting down of the mobile device, turning off of the mm-wave antennas, and power loss to the mobile device, among others.

The blocks of the flow diagrams of FIGS. 8, 9, and 10 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising: a processor;
a memory;
a wireless adapter to determine whether a millimeter-wave (mm-wave) connection is established between the information handling system and a Bluetooth (BT) enabled 5G access point;
a BT link module to, when the wireless adapter determines no mm-wave connection between the information handling system and the BT enabled 5G access point:
establish a BT connection with the BT enabled 5G access point;
acquire BT signals from a plurality of BT antennas;
calculate angle data descriptive of an angle of the information handling system relative to the BT enabled 5G access point; and
calculate distance data descriptive of a distance of the information handling system from the BT enabled 5G access point; and
a beamsteering module to:
conduct beamsweeping of a plurality of angles for a mm-wave antenna array using the angle data from the BT link module as an initial seed angle for the beamsweeping;
determine a selected beamsteering pattern from the information handling system to the BT enabled 5G access point to initiate the mm-wave communication with the BT enabled 5G access point based on signal quality above a threshold level; and
determine that the information handling system is within range of the BT enabled 5G access point to enable the mm-wave connection between the information handling system and BT enabled 5G access point using the selected beamsteering pattern.

2. The information handling system of claim 1, wherein the information handling system further sends the distance data and angle data to the BT enabled 5G access point to allow the BT enabled 5G access point to steer the BT enabled 5G access point beamsteering pattern toward the information handling system during beamsweeping.

3. The information handling system of claim 1, wherein the information handling system sends the selected beamsteering pattern to the BT enabled 5G access point to allow the BT enabled 5G access point to select a reciprocal beamsteering pattern from the BT enabled 5G access point to the information handling system for mm-wave communication between the BT enabled 5G access point and the information handling system.

4. The information handling system of claim 1, wherein, when the wireless adapter determines a mm-wave connection has been established between the information handling system and the BT enabled 5G access point, the wireless adapter iteratively determines: whether the information handling system is moving or whether a signal quality of the mm-wave connection has degraded below a second threshold level; and where it is determined that either the information handling system is moving or the signal quality of the mm-wave connection has degraded below the second threshold, the BT link module recalculates angle data descriptive of the angle of the information handling system relative to the BT enabled 5G access point and recalculates distance data descriptive of the distance of the information handling system from the BT enabled 5G access point.

5. The information handling system of claim 4, further comprising, at the beamsteering module receiving the recalculated angle data and recalculated distance data from the BT link module and selecting an adjusted beamsteering pattern from the information handling system to the BT enabled 5G access point to continue the mm-wave communication with the BT enabled 5G access point.

6. The information handling system of claim 1, wherein the BT link module implements a BT 5.1 proximity tracking to calculate the initial seed angle from the information handling system to the BT enabled 5G access point.

7. The information handling system of claim 1, wherein the wireless adapter is communicatively coupled to an array of sub-six GHz antennas to establish the BT connection with the BT enabled 5G access point and an array of mm-wave antennas to establish a mm-wave connection with the BT enabled 5G access point.

8. The information handling system of claim 1, where the angle data is calculated based on complex sampling (I/O) data descriptive of changes in a magnitude or amplitude in a phase of a sine wave of the signal emitted during the BT connection to the BT enabled 5G access point.

9. A method of establishing a millimeter-wave connection with a Bluetooth (BT) enabled BT enabled 5G access point at an information handling system, comprising:
determining, via a wireless adapter, whether a millimeter-wave (mm-wave) connection is established between the information handling system and a BT enabled 5G access point;
establishing a BT connection, via a BT link module, with the BT enabled 5G access point when the wireless adapter determines there is no mm-wave connection between the information handling system and the BT enabled 5G access point;
acquiring BT signals from a plurality of BT antennas;
calculating angle data descriptive of an angle of the information handling system relative to the BT enabled 5G access point;

calculating distance data descriptive of a distance of the information handling system from the BT enabled 5G access point;

conducting beamsweeping of a plurality of beamsteering angles via the beamsteering module for a mm-wave antenna array using the angle data from the BT link module as an initial seed angle for beamsweeping;

selecting a beamsteering pattern from the information handling system to the BT enabled 5G access point having a signal quality above a first threshold to initiate mm-wave communication with the BT enabled 5G access point; and establishing the mm-wave connection, via a wireless adapter, between the information handling system and BT enabled 5G access point using the selected beamsteering pattern.

10. The method of claim 9, further comprising sending the selected beamsteering pattern to the BT enabled 5G access point to allow the BT enabled 5G access point to calculate a reciprocal beamsteering pattern from the BT enabled 5G access point to the information handling system to establish the mm-wave connection.

11. The method of claim 9, further comprising, when the wireless adapter determines a mm-wave connection has been established between the information handling system and the BT enabled 5G access point, iteratively determining with the wireless adapter:

whether the information handling system is moving or whether a signal quality of the mm-wave connection has degraded below a threshold; and where it is determined that either the information handling system is moving or the signal quality of the mm-wave connection has degraded below a threshold, recalculating the angle data descriptive of the angle of the information handling system relative to the BT enabled 5G access point and recalculating distance data descriptive of the distance of the information handling system from the BT enabled 5G access point.

12. The method of claim 11, further comprising, at the beamsteering module, receiving the recalculated angle data and recalculated distance data from the BT link module and calculating an adjusted beamsteering pattern from the information handling system to the BT enabled 5G access point to continue the mm-wave communication with the BT enabled 5G access point.

13. The method of claim 9, further comprising determining that the information handling system is within range of the BT enabled 5G access point for mm-wave communication using the calculated distance data.

14. The method of claim 9, wherein establishing a plurality of BT connections with a plurality BT enabled 5G access points to calculate initial seed angles for beamsweeping to the plurality of BT enabled 5G access points.

15. An information handling system, comprising:
a processor;
a memory;
a Bluetooth (BT) link module to:
establish a BT connection with a BT enabled 5G access point to respond to BT signals from a plurality of BT antennas at the BT enabled 5G access point for determination of an initial seed angle via BT proximity tracking for beamsweeping at the BT enabled 5G access point;
receives distance from the BT enabled 5G access point to determine whether the information handling system is within range of the BT enabled 5G access point to enable the mm-wave communication between the information handling system and BT enabled 5G access point using the reciprocal beamsteering pattern;

a beamsteering module to:
receive a selected beamsteering pattern from the BT enabled 5G access point resulting from beamsweeping selection based on signal quality above a first threshold level and determining a reciprocal beamsteering pattern toward the BT enabled 5G access point for a mm-wave antenna array to initiate a mm-wave communication with the BT enabled 5G access point; and a wireless adapter to establish the mm-wave communication between the information handling system and BT enabled 5G access point using the reciprocal beamsteering pattern.

16. The information handling system of claim 15, wherein the information handling system further receives distance from the BT enabled 5G access point to determine whether the information handling system is within range of the BT enabled 5G access point to enable the mm-wave communication between the information handling system and BT enabled 5G access point using the reciprocal beamsteering pattern.

17. The information handling system of claim 15, further comprising:

the information handling system iteratively determines whether the information handling system is moving or whether a signal quality of the mm-wave connection has degraded below a second threshold level; and where it is determined that either the information handling system is moving or the signal quality of the mm-wave connection has degraded below the second threshold, the BT link module receives a reselected beamsteering pattern from the BT enabled 5G access point based on recalculated angle data descriptive of the angle of the information handling system relative to the BT enabled 5G access point and recalculated distance data descriptive of a distance of the information handling system from the BT enabled 5G access point.

18. The information handling system of claim 17, wherein the received reselected beamsteering pattern from the BT enabled 5G access point is used to determine an adjusted reciprocal beamsteering pattern from the information handling system to the BT enabled 5G access point to continue the mm-wave communication with the BT enabled 5G access point.

19. The information handling system of claim 15, wherein the wireless adapter is communicatively coupled an array of mm-wave antennas to select directionality of a mm-wave connection with the BT enabled 5G access point via the reciprocal beamsteering pattern.

20. The information handling system of claim 17, where the angle data is calculated based on complex sampling (I/O) data descriptive of changes in a magnitude or amplitude in a phase of a sine wave of the signal emitted during the BT connection to the BT enabled 5G access point.

* * * * *